US012752605B2

(12) United States Patent
Getzschman et al.

(10) Patent No.: US 12,752,605 B2
(45) Date of Patent: Oct. 6, 2026

(54) ARRANGEMENT OF A VEHICLE TAILGATE WINDOW ASSEMBLY AND REAR CORNER ASSEMBLY

(71) Applicant: Bestop, Inc., Louisville, CO (US)

(72) Inventors: Eric D. Getzschman, New Baltimore, MI (US); Charles C. Turney, Toledo, OH (US); David A. Smith, Macomb Township, MI (US); Tavis Lutzka, Rochester Hills, MI (US)

(73) Assignee: Bestop, Inc., Westminster, CO (US)

( * ) Notice: Subject to any disclaimer, the term of this patent is extended or adjusted under 35 U.S.C. 154(b) by 473 days.

(21) Appl. No.: 18/549,199

(22) PCT Filed: Oct. 24, 2022

(86) PCT No.: PCT/US2022/047522
§ 371 (c)(1),
(2) Date: Sep. 6, 2023

(87) PCT Pub. No.: WO2023/069769
PCT Pub. Date: Apr. 27, 2023

(65) Prior Publication Data

US 2024/0166027 A1 May 23, 2024

Related U.S. Application Data

(60) Provisional application No. 63/271,018, filed on Oct. 22, 2021.

(51) Int. Cl.
*B60J 1/00* (2006.01)
*B60J 1/08* (2006.01)
(Continued)

(52) U.S. Cl.
CPC ............... *B60J 1/007* (2013.01); *B60J 1/085* (2013.01); *B60J 1/18* (2013.01); *B60J 5/105* (2013.01); *E05C 3/14* (2013.01)

(58) Field of Classification Search
CPC ..... B60J 1/007; B60J 1/085; B60J 1/18; B60J 1/005; B60J 1/006; B60J 1/008;
(Continued)

(56) References Cited

U.S. PATENT DOCUMENTS 3,167,349 A * 1/1965 Young ........................ B60J 7/10 296/100.1
6,827,391 B1 * 12/2004 Kohn ......................... B60J 7/10 296/146.14
(Continued)

FOREIGN PATENT DOCUMENTS

KR 19980035405 A 8/1998

OTHER PUBLICATIONS

Notification of Transmittal of the International Search Report and the Written Opinion of the International Searching Authority for International Application No. PCT/US202022/047522, Mailed Mar. 6, 2023.

*Primary Examiner* — Wenwei Zhuo
(74) *Attorney, Agent, or Firm* — Butzel Long; Gregory Ozga

(57) ABSTRACT

An arrangement for a tailgate and rear corner window assembly of a vehicle. The vehicle includes a door envelope for pivotal attachment to a vehicle. The door envelope is positioned at a rear of the vehicle. The arrangement includes a rear window assembly having a window frame and a window glass mounted in the window frame. The rear window assembly has a latch that secures a connection with the door envelope. The arrangement also includes at least one rear corner window assembly for connection to the vehicle having a window glass mounted in a window frame. The window frame includes a bottom edge, a top edge, a side portion extending in a longitudinal direction and a rear portion that curves and extends away from the side portion.
(Continued)

There is a latch located on an inside surface of the rear portion of the at least one rear corner window assembly.

16 Claims, 32 Drawing Sheets

(51) Int. Cl.
*B60J 1/18* (2006.01)
*B60J 5/10* (2006.01)
*E05C 3/14* (2006.01)

(58) Field of Classification Search
CPC ........ B60J 1/1807; B60J 1/1823; B60J 1/183; B60J 5/105; B60J 5/107; E05C 3/14
USPC ...... 296/146.8, 146.16, 146.15, 148; 49/463, 49/464, 465
See application file for complete search history.

(56) References Cited

U.S. PATENT DOCUMENTS

| | | | | |
|---|---|---|---|---|
| 7,011,357 | B2 * | 3/2006 | Seksaria | B60J 5/10 296/146.12 |
| 2017/0349032 | A1 * | 12/2017 | Lewis | B60J 7/10 |
| 2018/0229588 | A1 * | 8/2018 | Lewis | B60J 1/004 |
| 2019/0249473 | A1 | 8/2019 | Damboiu et al. | |
| 2020/0070634 | A1 * | 3/2020 | Mathews | B60J 1/18 |
| 2021/0156183 | A1 * | 5/2021 | Kim | E05C 9/045 |
| 2021/0309084 | A1 * | 10/2021 | Larson | B60J 1/1823 |

* cited by examiner

ARRANGEMENT OF A VEHICLE TAILGATE WINDOW ASSEMBLY AND REAR CORNER ASSEMBLY

FIELD OF THE INVENTION

The field of the present invention is that of an arrangement of a rear tailgate window assemblies and rear corner assemblies for sports utility vehicle (SUV) type vehicles, especially Jeep® type vehicles.

BACKGROUND OF THE INVENTION

To enhance the enjoyment of the environment it is often desirable to remove or fold the roof structure of the vehicle. For certain SUV's this requires the removal of rear corner windows and rear windows, which are formed of fabric type material. For SUVs that have hard roofs the rear corner windows and rear window are typically attached to a hard roof portion that is removed as a single piece with the portion of the roof structure. This involves using special tools, areas to store the parts and often requires more than one person for removal. It is desirable that the removal and reinstallation process be easy is possible to accomplished without the extensive use of tooling and be manageable for a single user. It is also desirable to provide multiple smaller pieces that are easier to store and can even be stored in the vehicle once removed.

SUMMARY OF THE INVENTION

An arrangement for a tailgate and rear corner window assembly of a vehicle. The vehicle is a sports utility vehicle (SUV). The vehicle includes a door envelope for pivotal attachment to a vehicle. The door envelope is positioned at a rear of the vehicle. The arrangement includes a rear window assembly having a window frame and a window glass mounted in the window frame. The rear window assembly has a latch that secures a connection with the door envelope. There is further provided at least one rear corner window assembly for connection to the vehicle having a window glass mounted in a window frame. The window frame includes a bottom edge, a top edge, a side portion extending in a longitudinal direction and a rear portion that curves and extends away from the side portion. A latch located on an inside surface of the rear portion of the at least one rear corner window assembly.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE INVENTION

Figure 1:
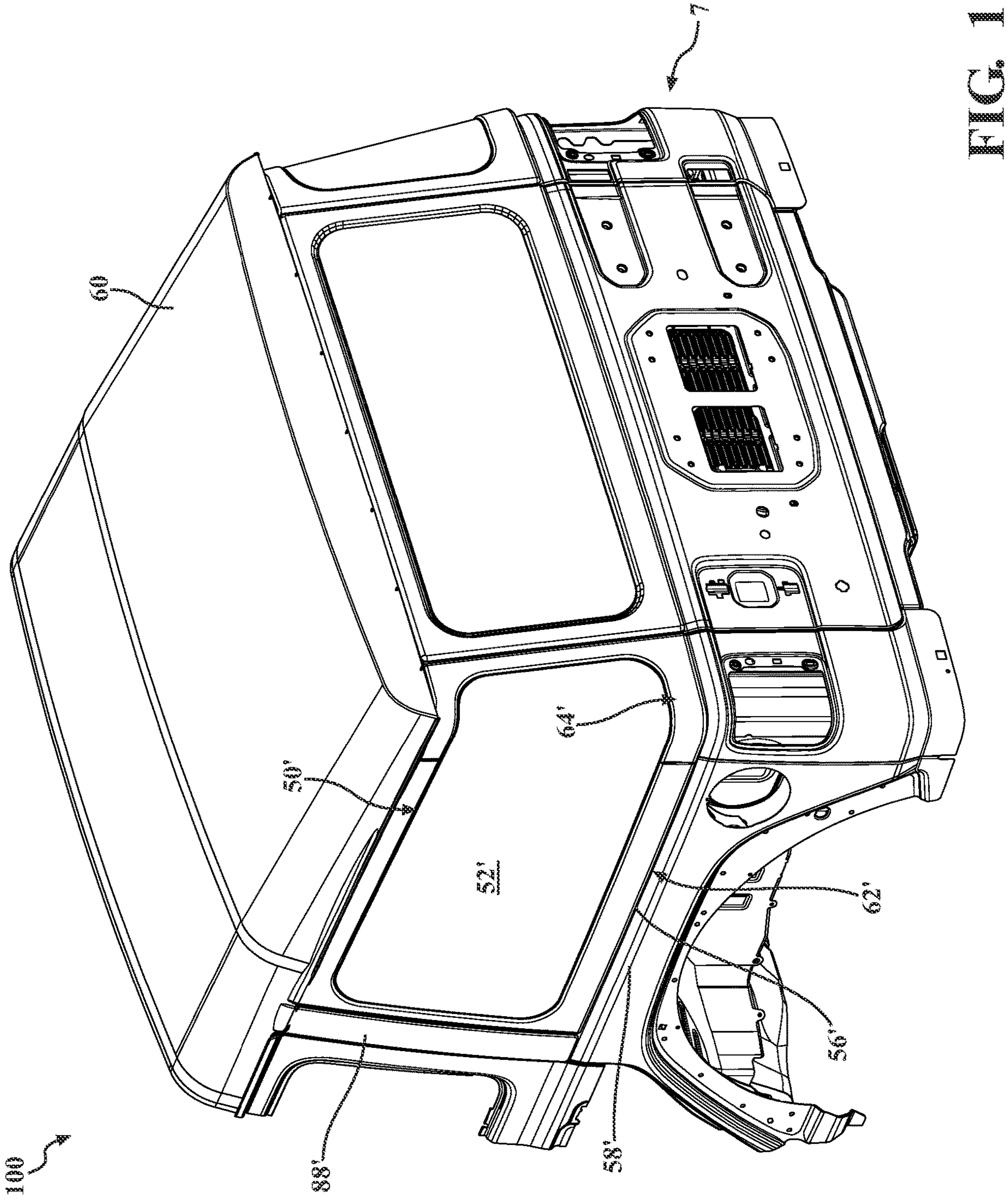
FIG. 1 is a perspective rear view of a vehicle with the rear corner window assembly and rear corner tailgate window assembly according to the present invention.
Figure 2:
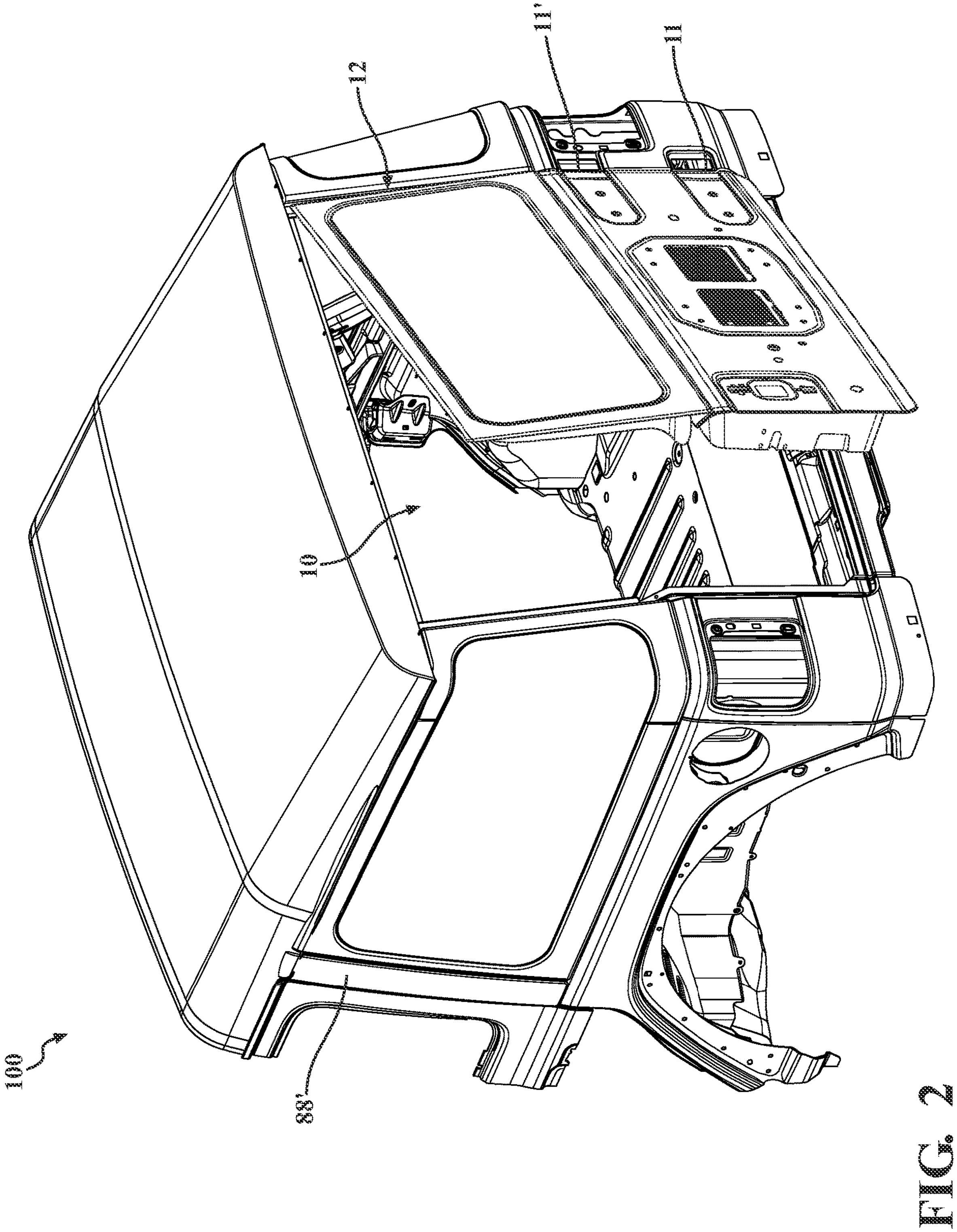
FIG. 2 is a operational view illustrating opening of the tailgate.
Figure 3:
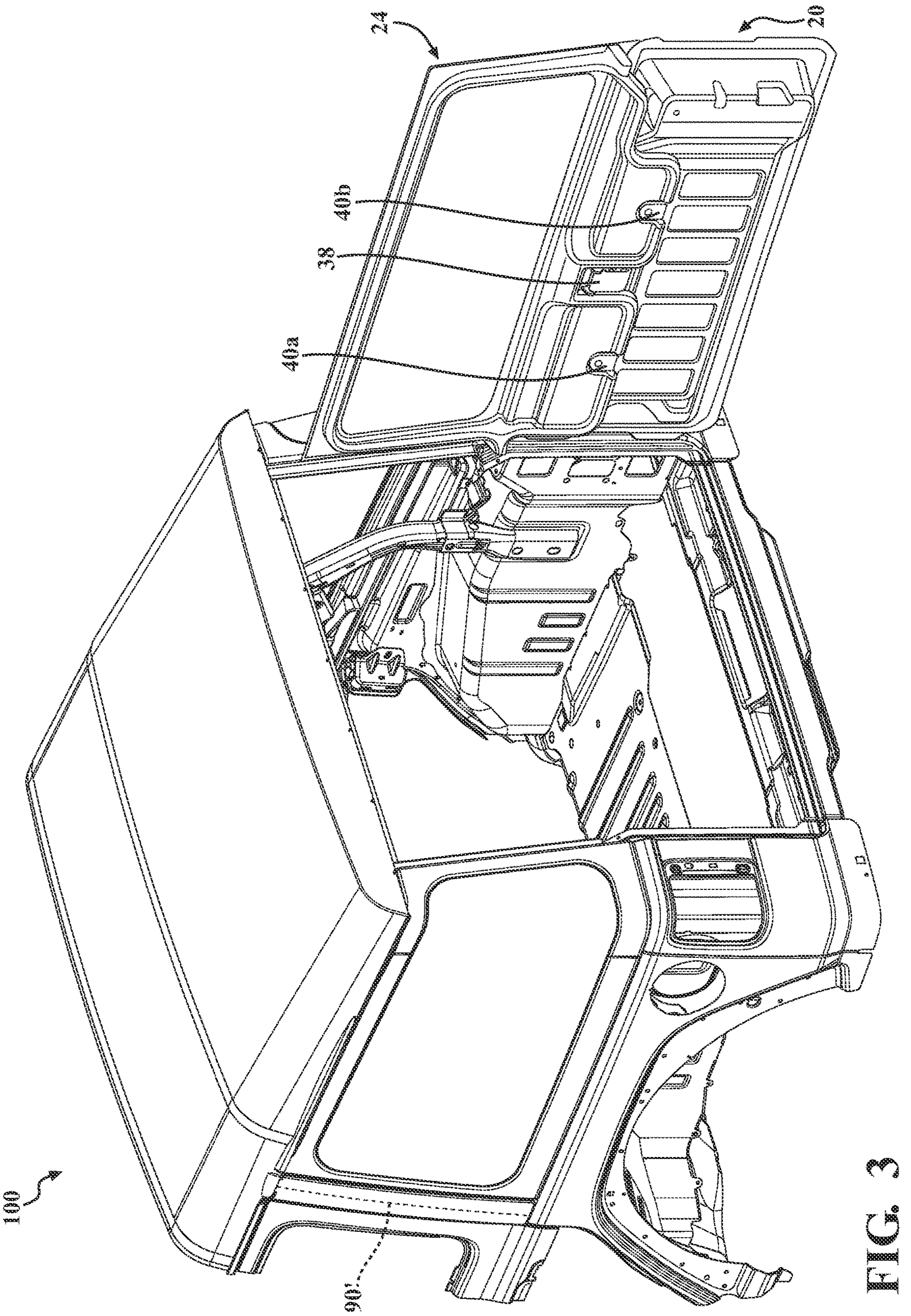
FIG. 3 is in operational view illustrating further opening of the tailgate.
Figure 4:
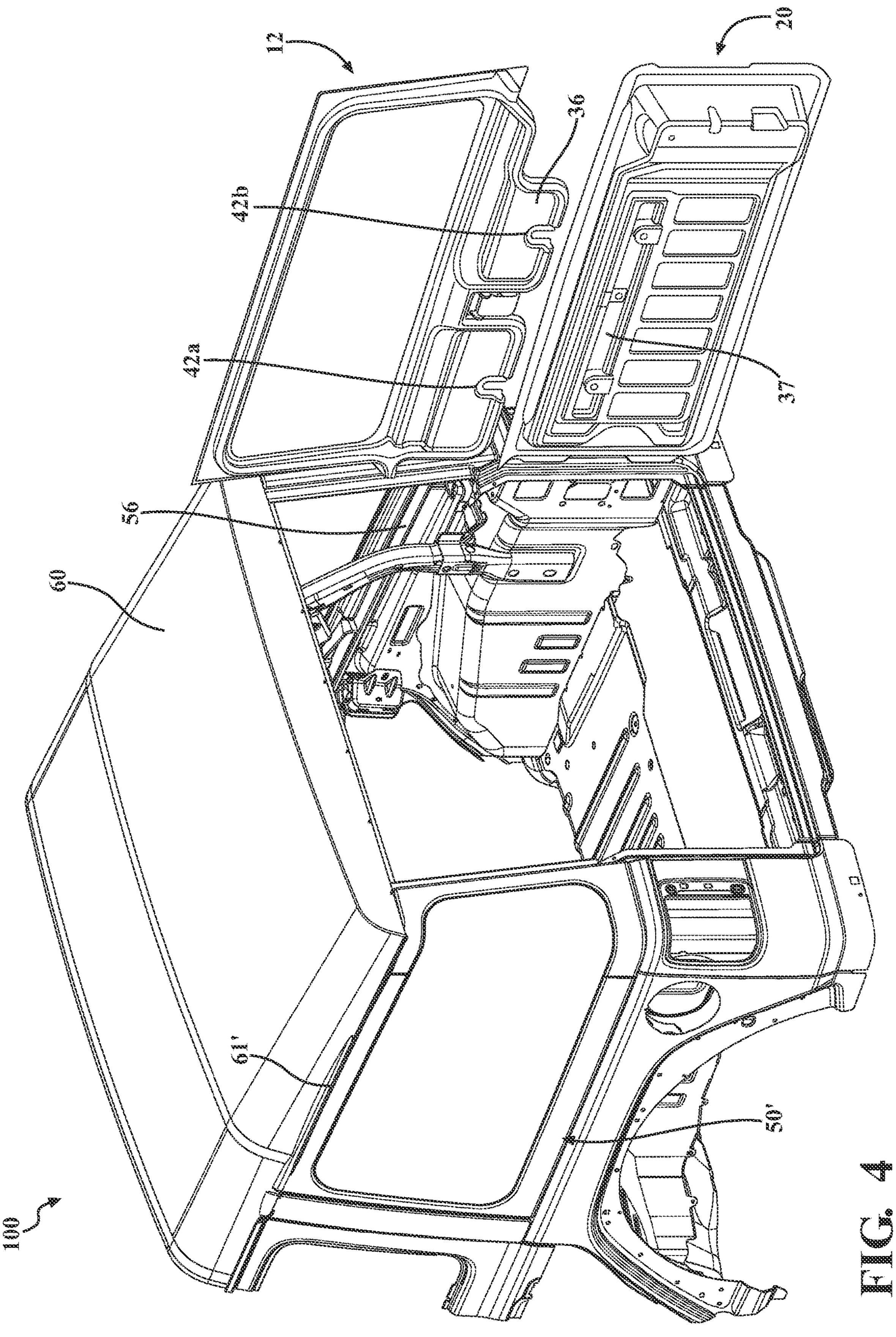
FIG. 4 is an operational view illustrating the beginning of removal of the rear tailgate window assembly.

Referring to FIGS. 1 through 11 an arrangement for a tailgate and rear corner window assembly 100 with a tailgate 10 having a rear window assembly 12 for an automotive vehicle 7 is shown. The vehicle 7 is a SUV having a two rear wheel wells 14, 14'. Closing off the space between the opposing wheel wells 14, 14' of the vehicle is the tailgate 10. The tailgate 10 is provided by a door envelope 20 that is pivotally attached to the body of the vehicle 7 at a vertical pivotal axis by hinge members 11, 11'. However, in other embodiments the tailgate 10 can be additionally or alternatively pivotally connected to the body along it's lower in about a horizontal pivotal axis. The door envelope 20 has on its outer rear surface a forward inclined flange surface 22.

The window assembly 12 has a window frame 24. Mounted in the window frame 24 via an outer subframe 32 is a window glass 28. Window glass 28 can typically be a rigid material such as glass or a suitable hard plastic. The outer subframe 32 extends outwardly over the forward incline flanged surface 22 of the door envelope. The window frame 24 has a lower skirt 36. Connected on the lower skirt 36 is a latch member 38. The latch member 38 allows the window assembly 12 to have a latched connection with the door envelope 20. The latch member 38 is typically positioned adjacent the lateral centerline of the window assembly 12, however it is within the scope of this invention for multiple latches to be used. The lower skirt 36 of the window frame is removably connected to a connection belt 37 connected to an inside surface of the door envelope 20. The connection belt 37 has a latch plate 39 that the latch member 38 engages and there are locator wedges 40*a*, 40*b* that align with grooves 42*a*, 42*b* respectively formed on the lower skirt 36. The locator wedges 40*a*, 40*b* align and the window assembly 12 to the door envelope 20. The locator wedges 40*a*, 40*b* also hold the window assembly 12 in place using flanges that create grooves 44*a*, 44*b*, 44*c*, 44*d* for receiving edge of the grooves 42*a*, 42*b* formed on the lower skirt 36, thereby preventing the window assembly from falling forward, rearward or sideways of the door envelope 20. The connection belt 37 is connected to the door envelope 20 using fasteners 34, however, it is within the scope of this invention for the connection belt 37 to be connected by adhesives or to be integrally formed on the inside surface of the door envelope 20 by welding, molding or stamping.

Figure 5:
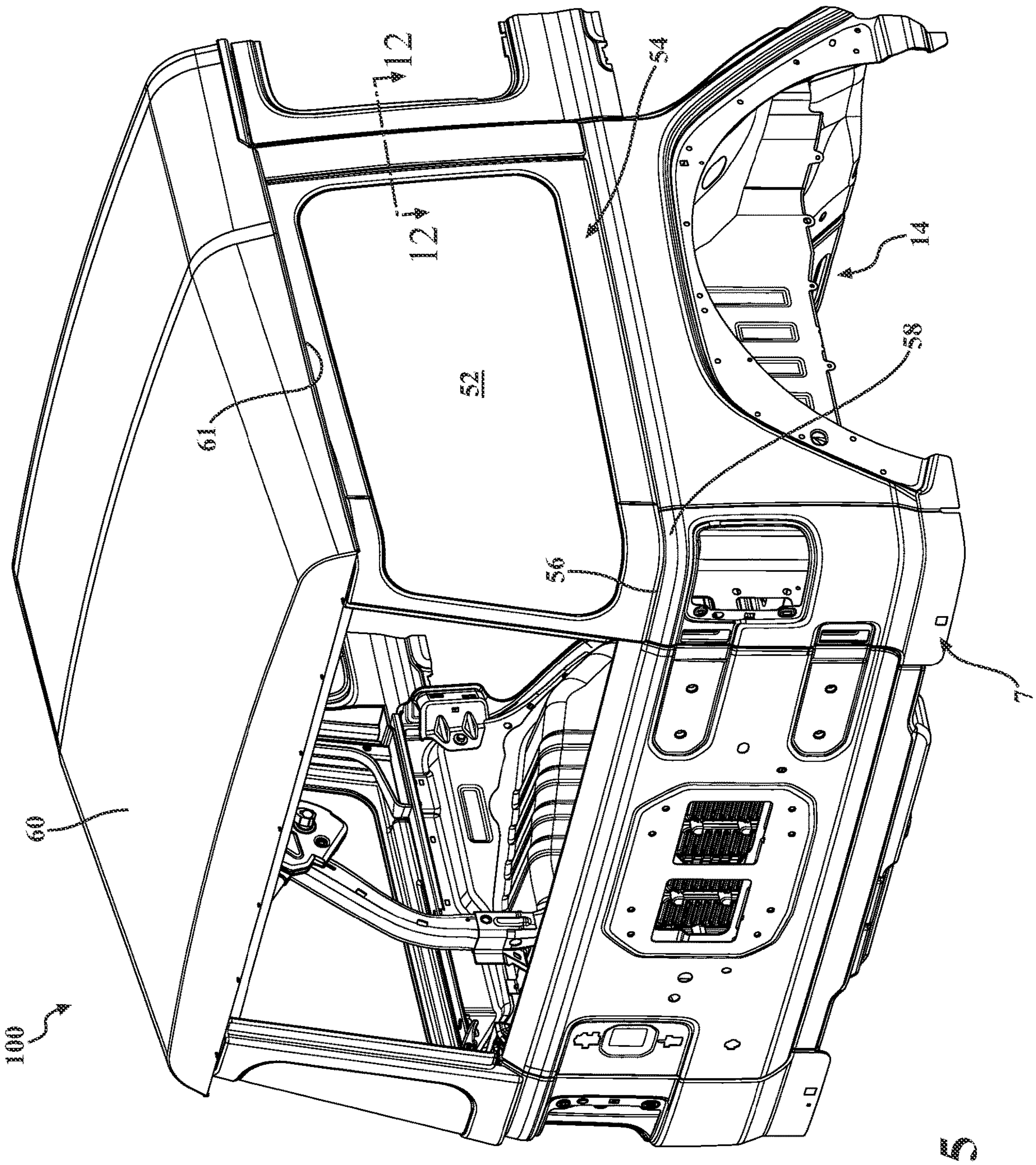
FIG. 5 is a view of the tailgate with the rear tailgate window assembly removed.
Figure 9:
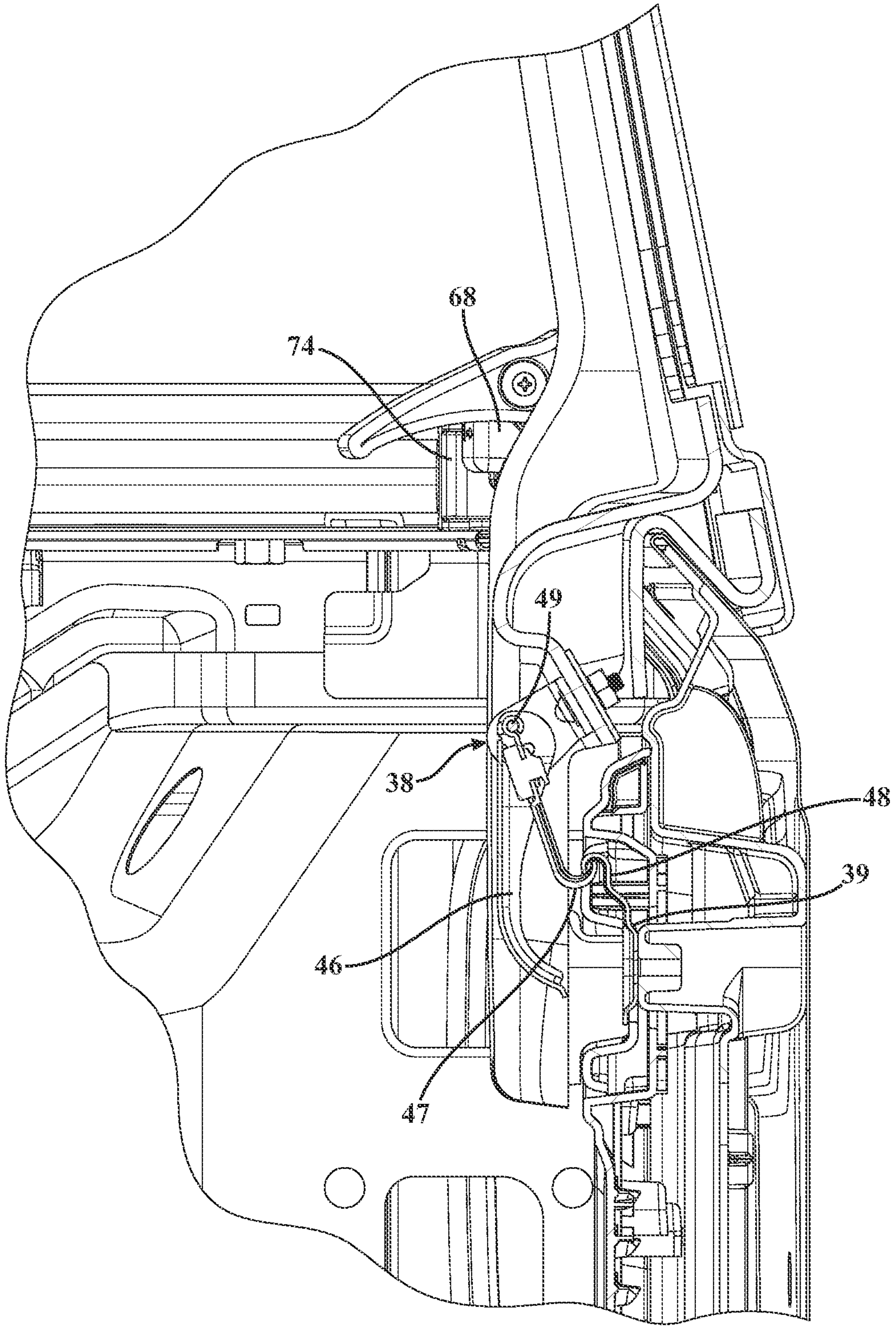
FIG. 9 is a cross-sectional elevational side view of a latch of the lower skirt connected to a latch plate.
Figure 10:
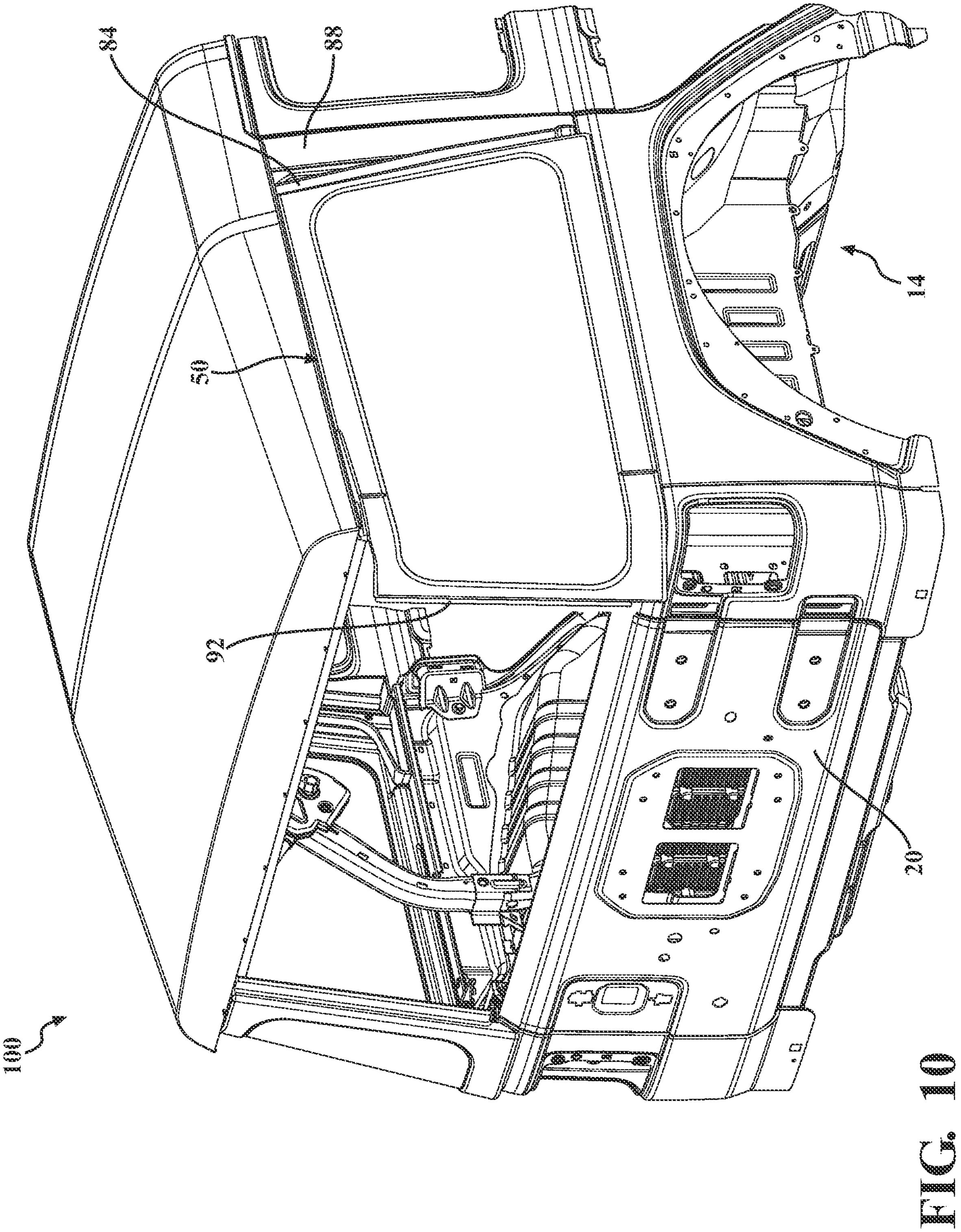
FIG. 10 is an operation view illustrating the removal of the rear corner window assembly.
Figure 11:
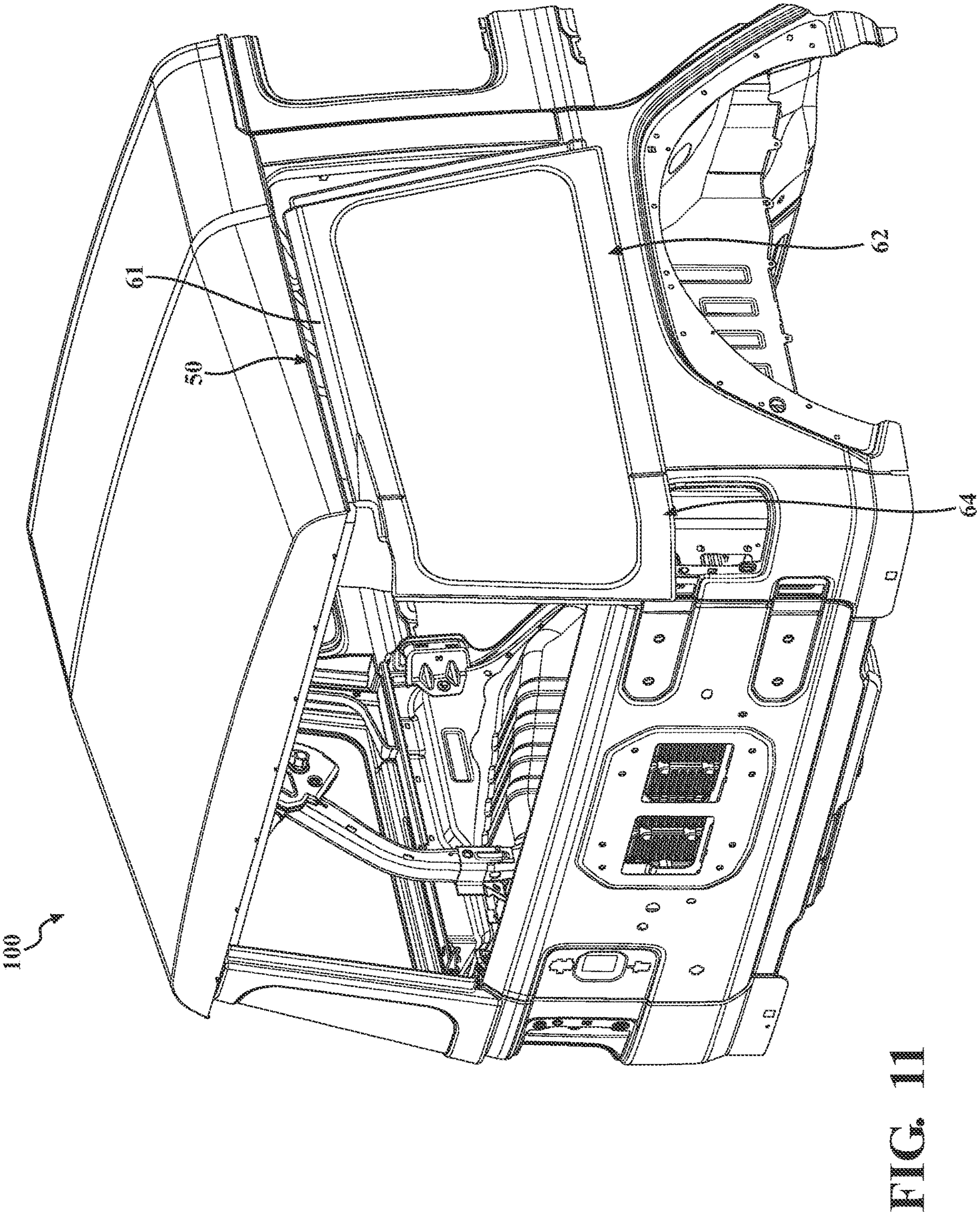
FIG. 11 is an operation view illustrating the removal of the rear corner window assembly.
Figure 12:
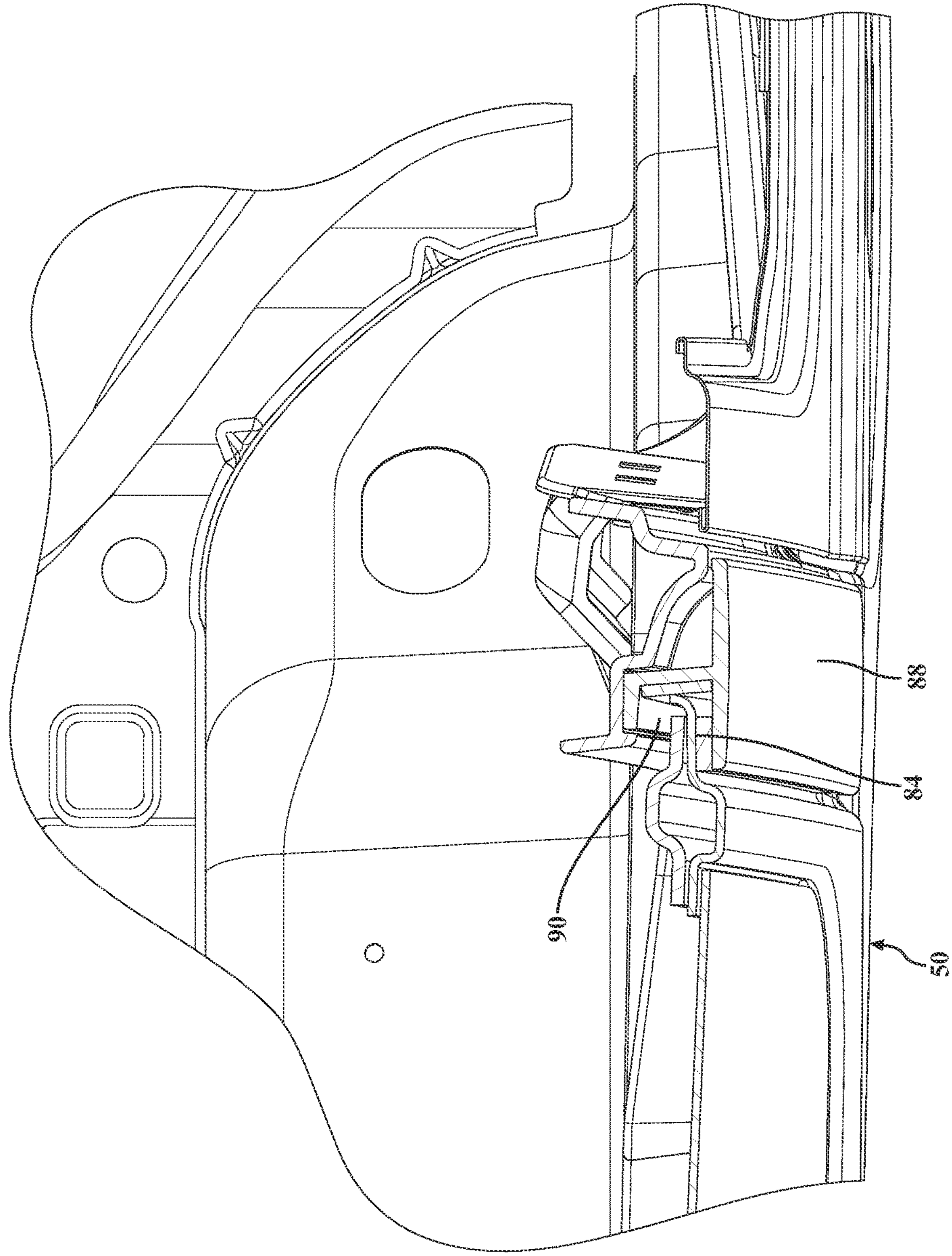
FIG. 12 is a top perspective cross-sectional view of a forward edge of a rear corner window assembly connected to a channel of a pillar.
Figure 13:
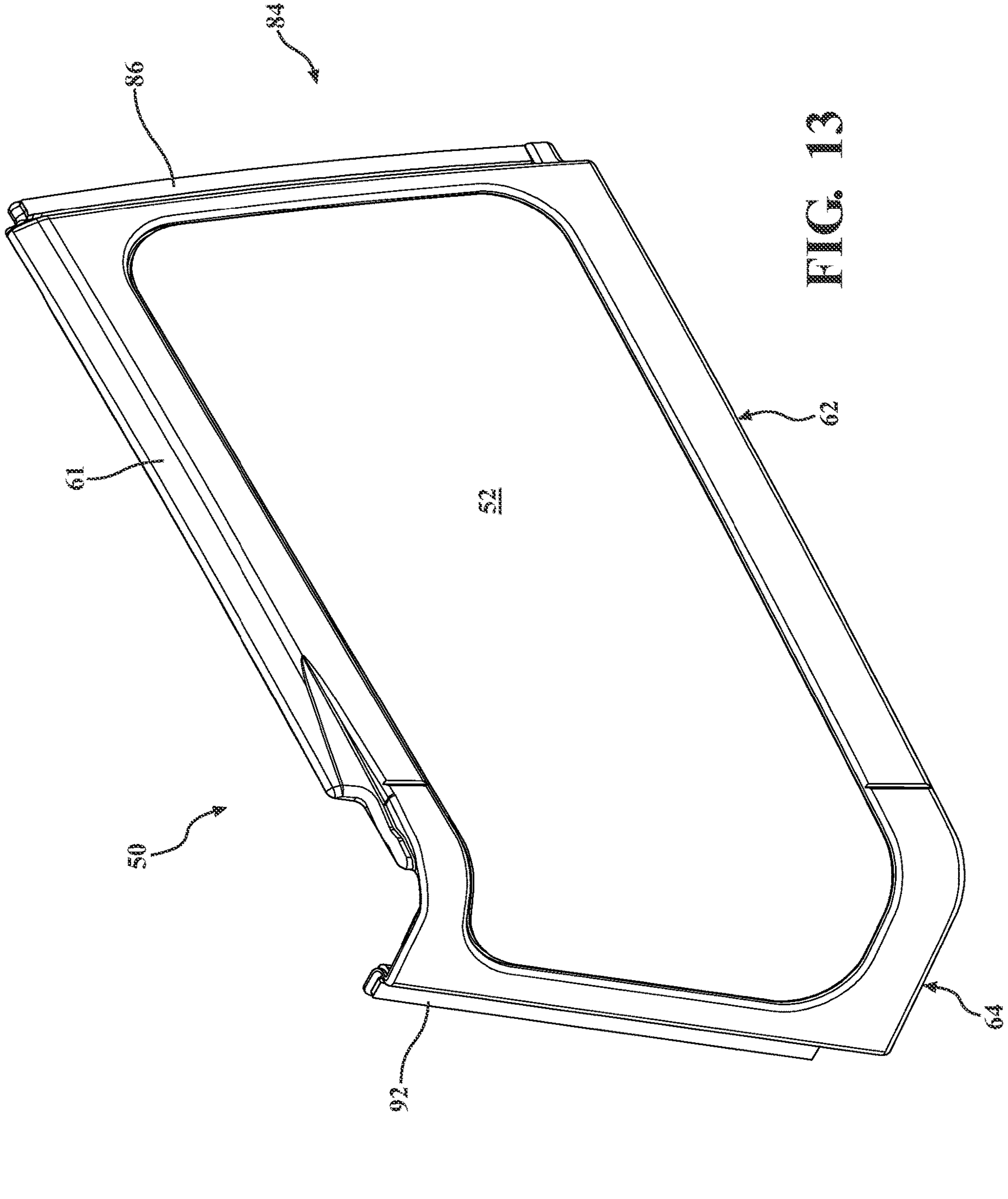
FIG. 13 is a rear side perspective view of the rear corner window assembly.
Figure 14:
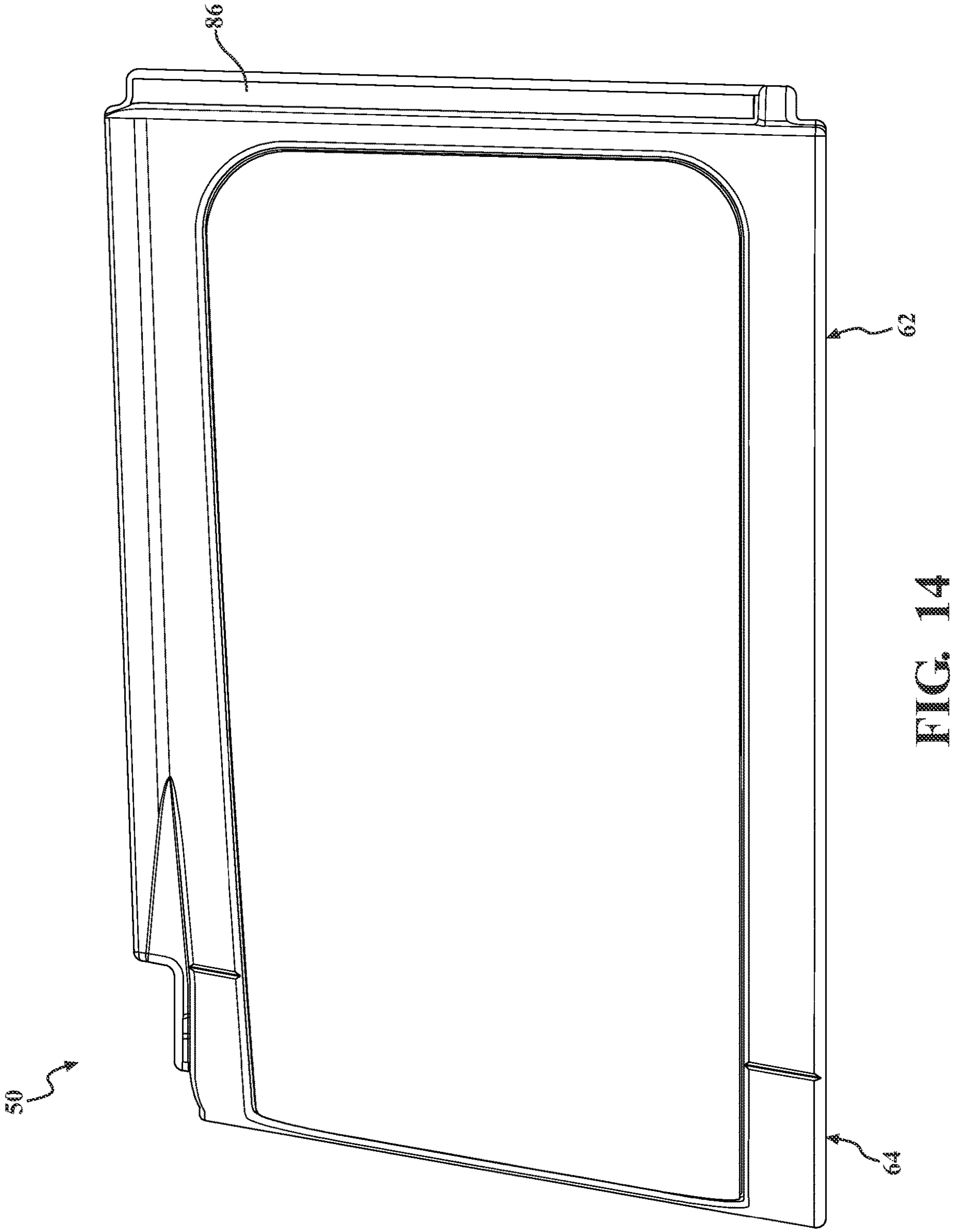
FIG. 14 is a side elevational view of the rear corner window assembly.
Figure 15:
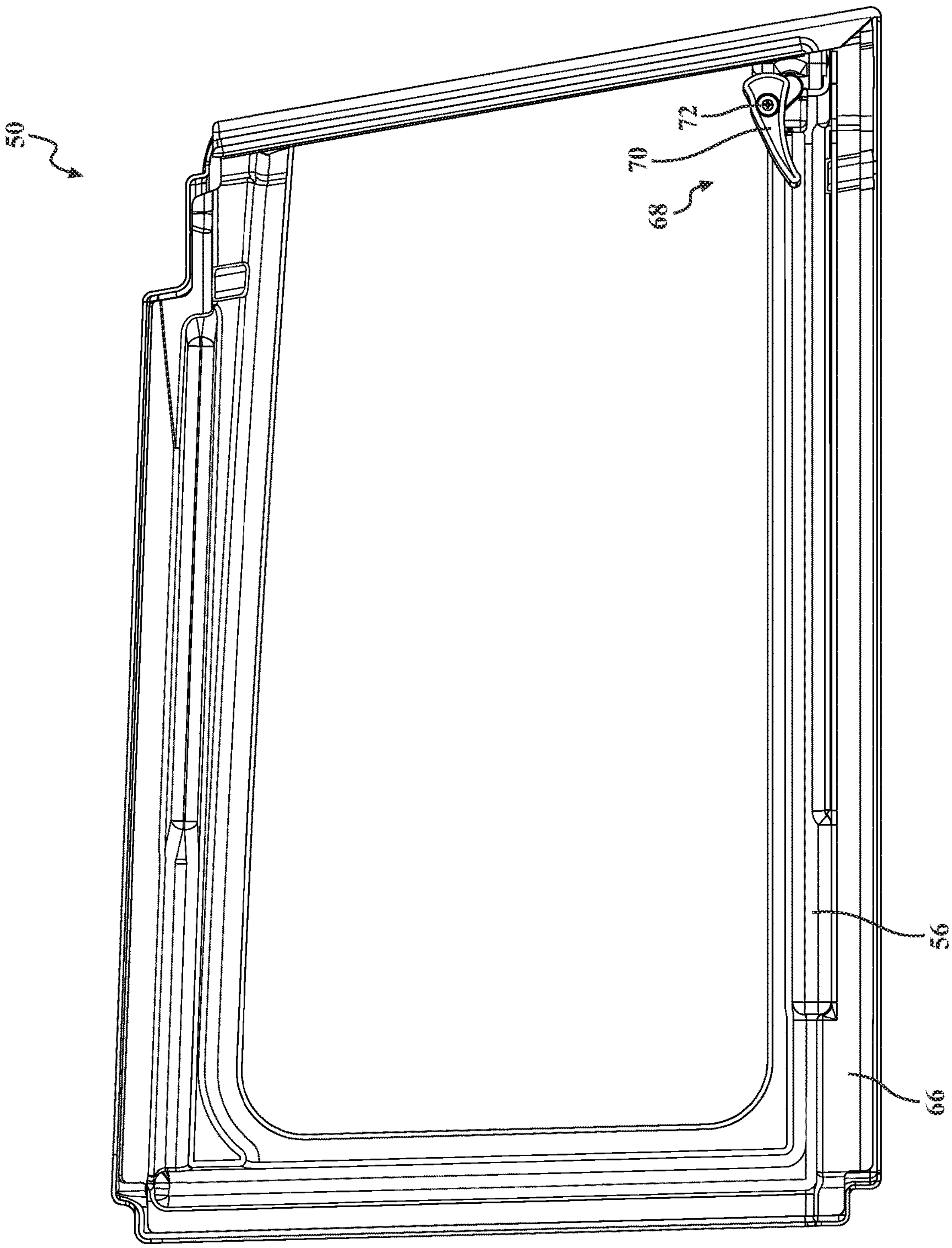
FIG. 15 is a side elevational view of the rear corner window assembly.
Figure 17:
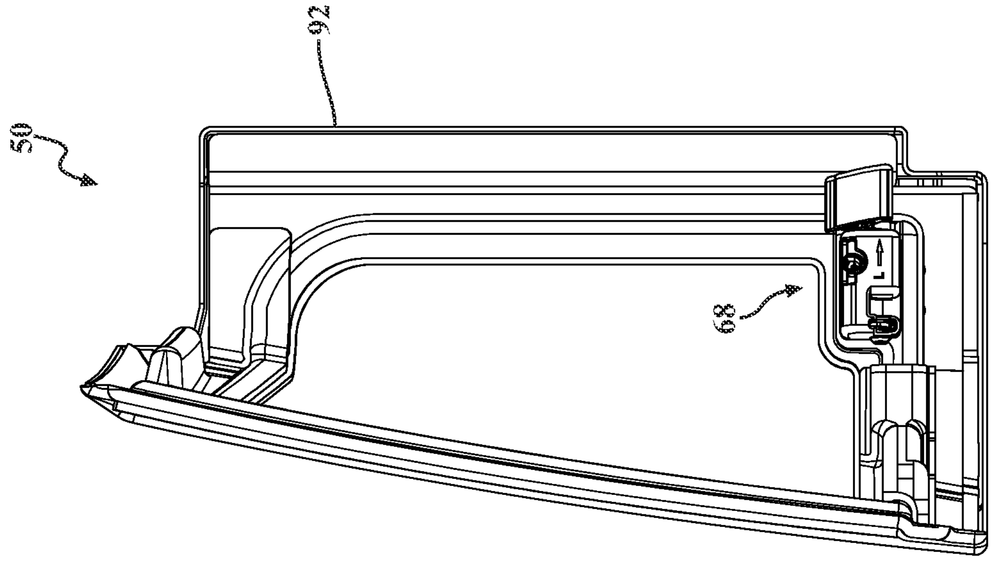
FIG. 17 is an end side elevational view of the rear corner window assembly.
Figure 16:
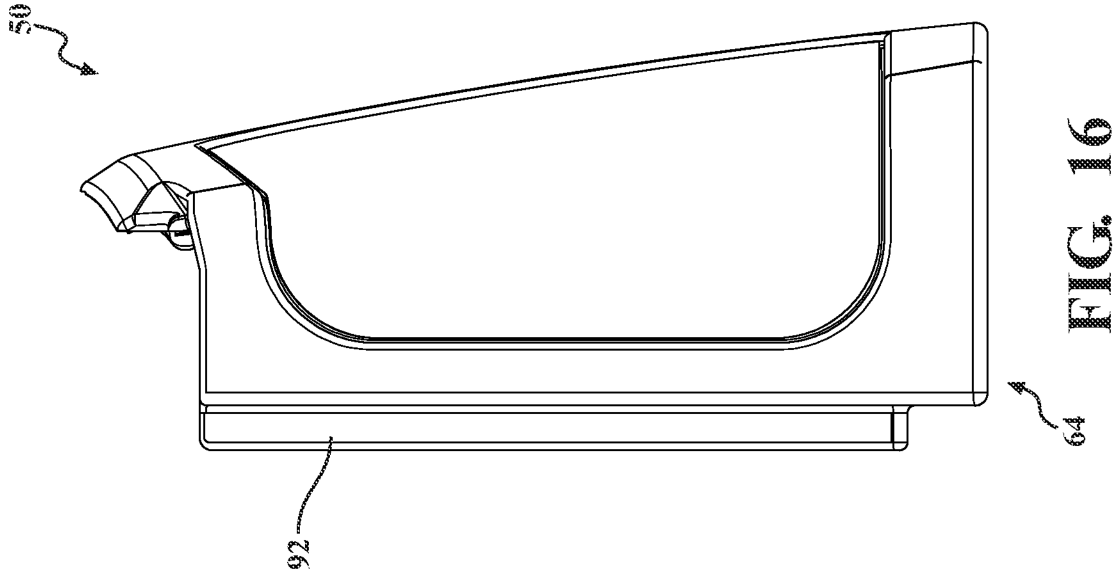
FIG. 16 is an end side elevational view of the rear corner window assembly.
Figure 18:
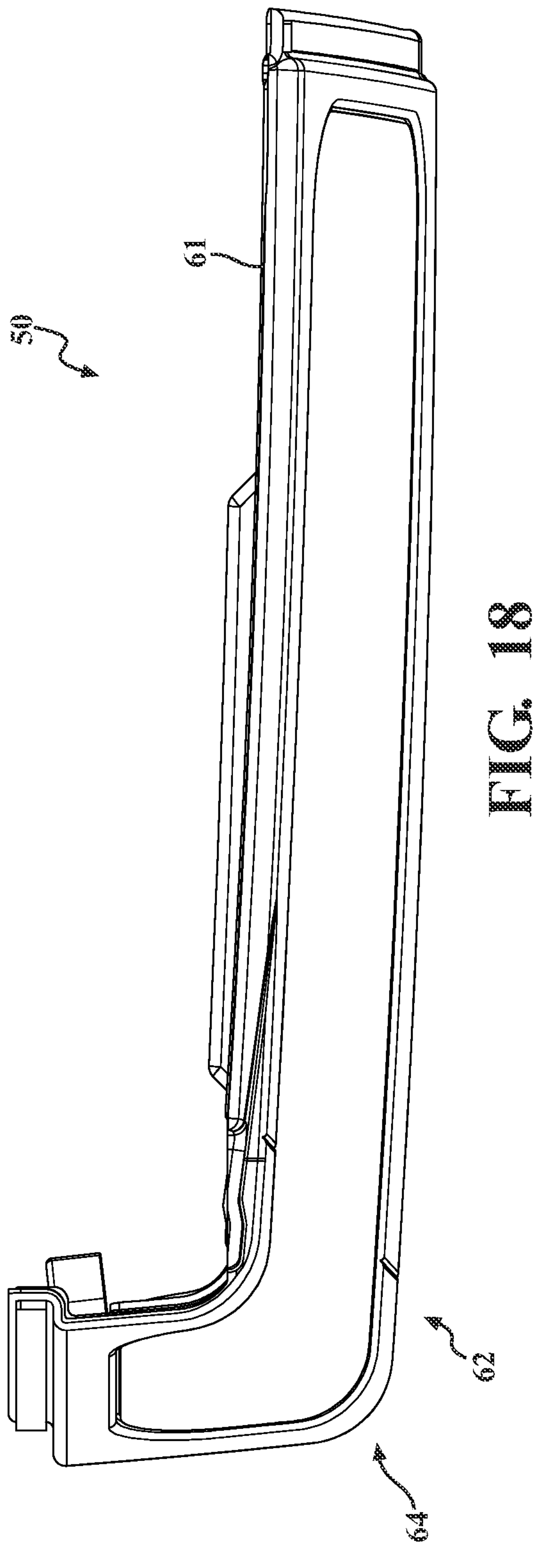
FIG. 18 is a top perspective view of the rear corner window assembly.
Figure 19:
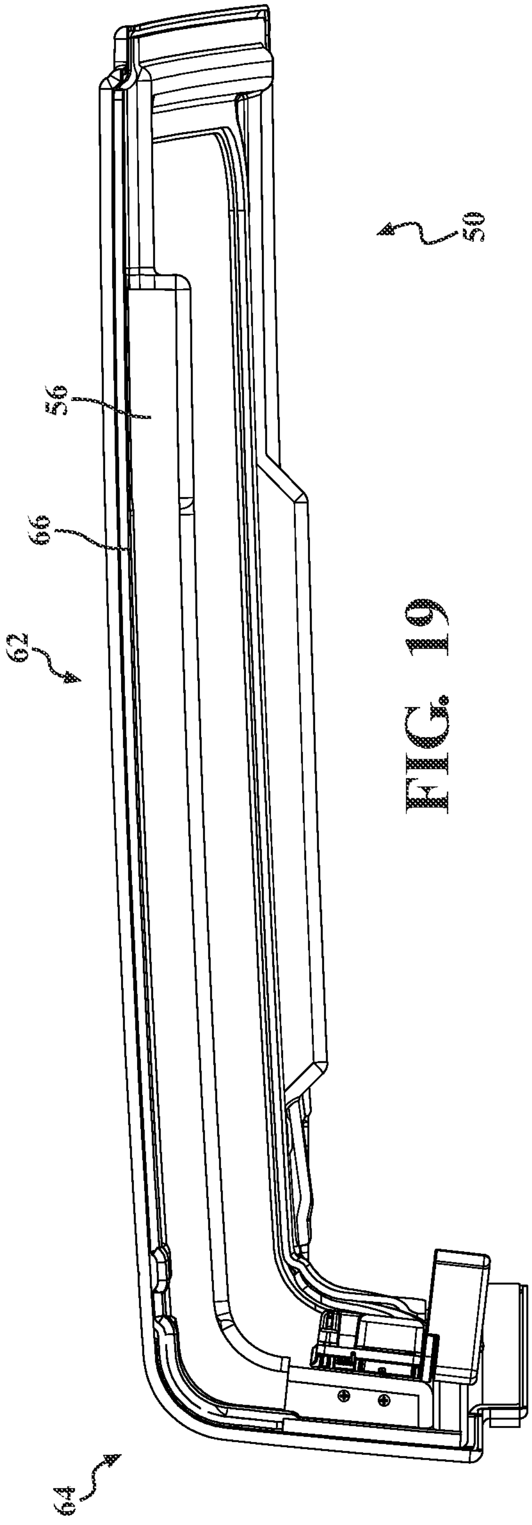
FIG. 19 is a bottom perspective view of the rear corner window assembly.
Figure 20:
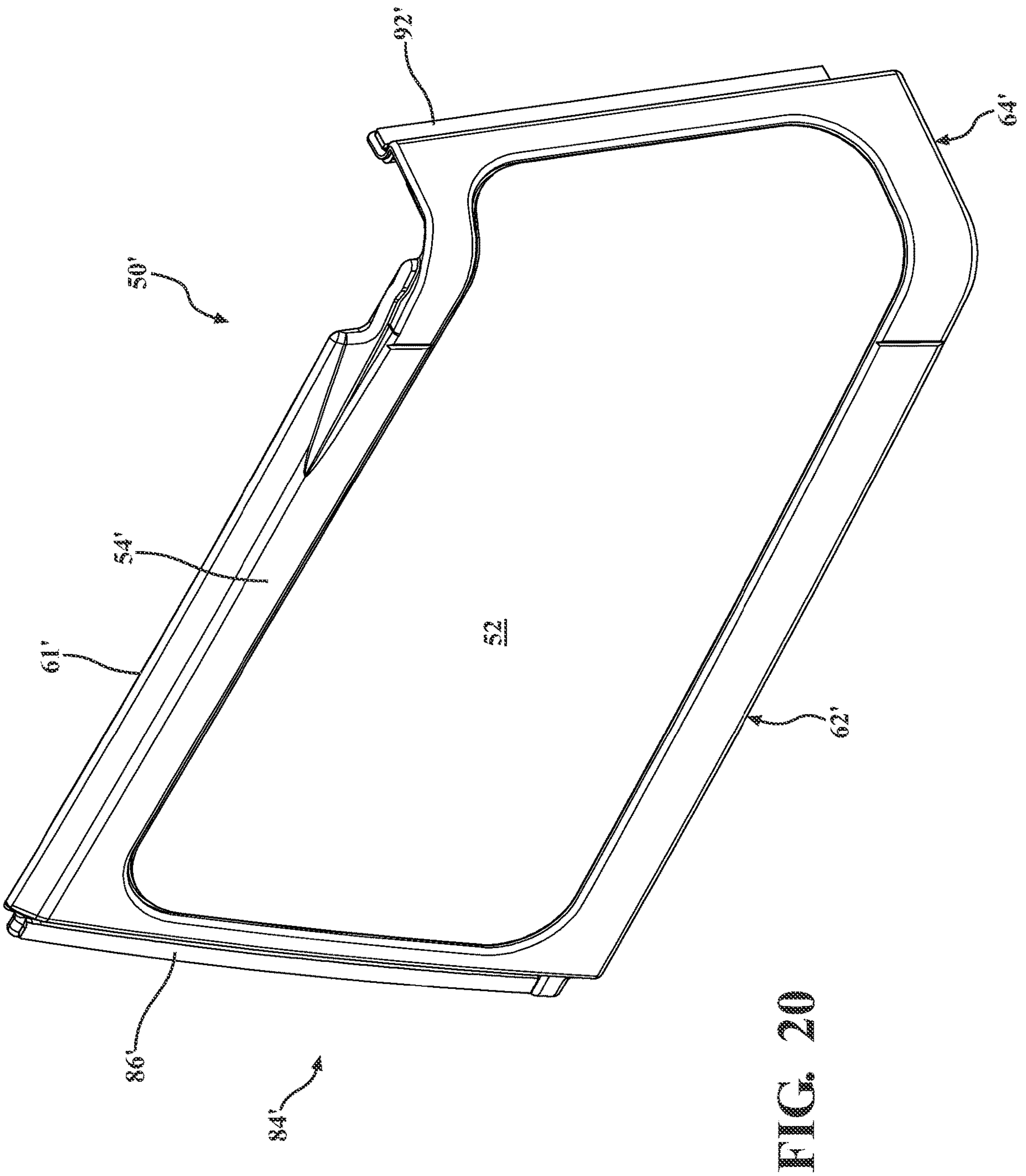
FIG. 20 is a rear side perspective view of the rear corner window assembly.
Figure 21:
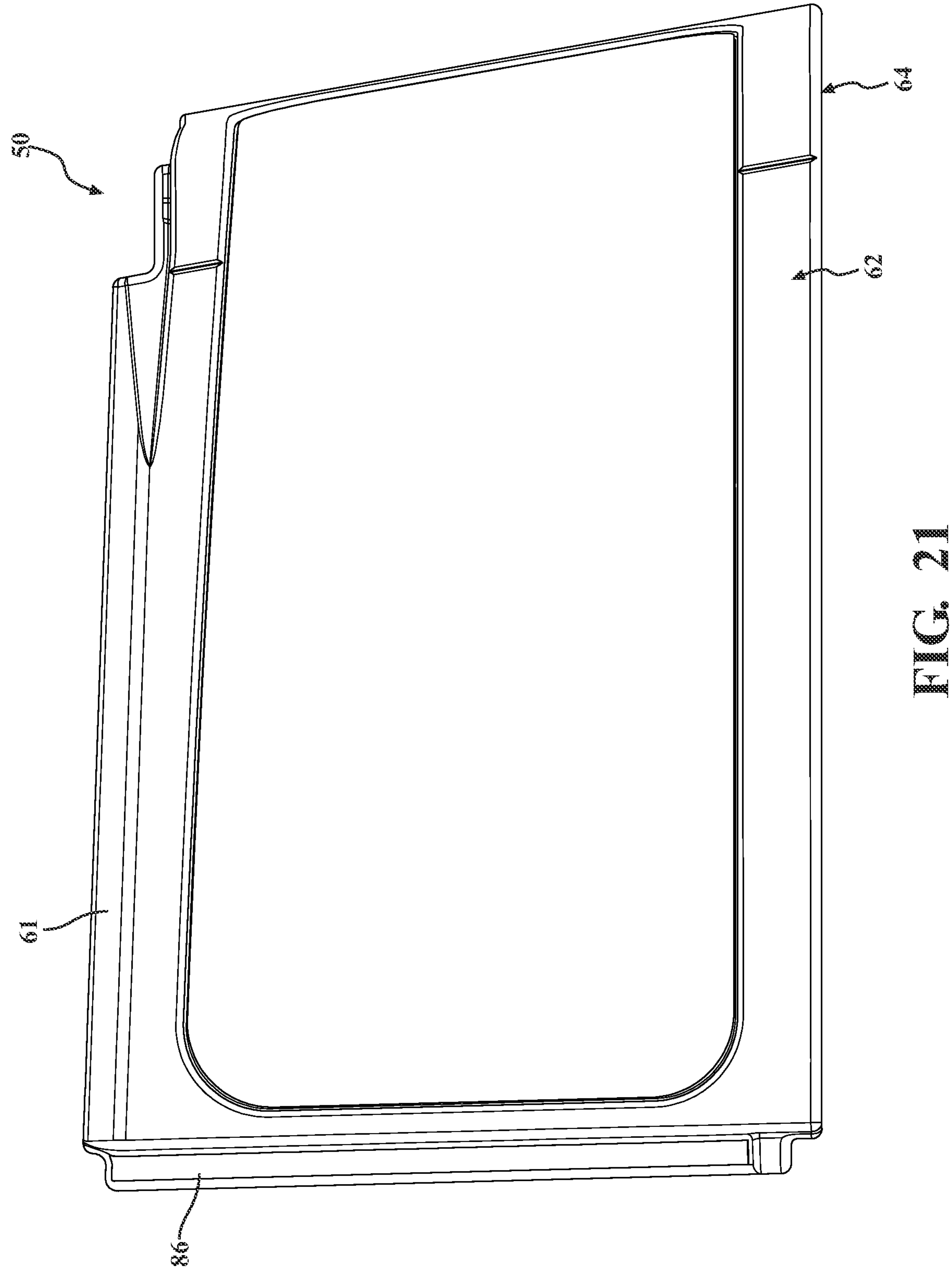
FIG. 21 is a side elevational view of the rear corner window assembly.
Figure 22:
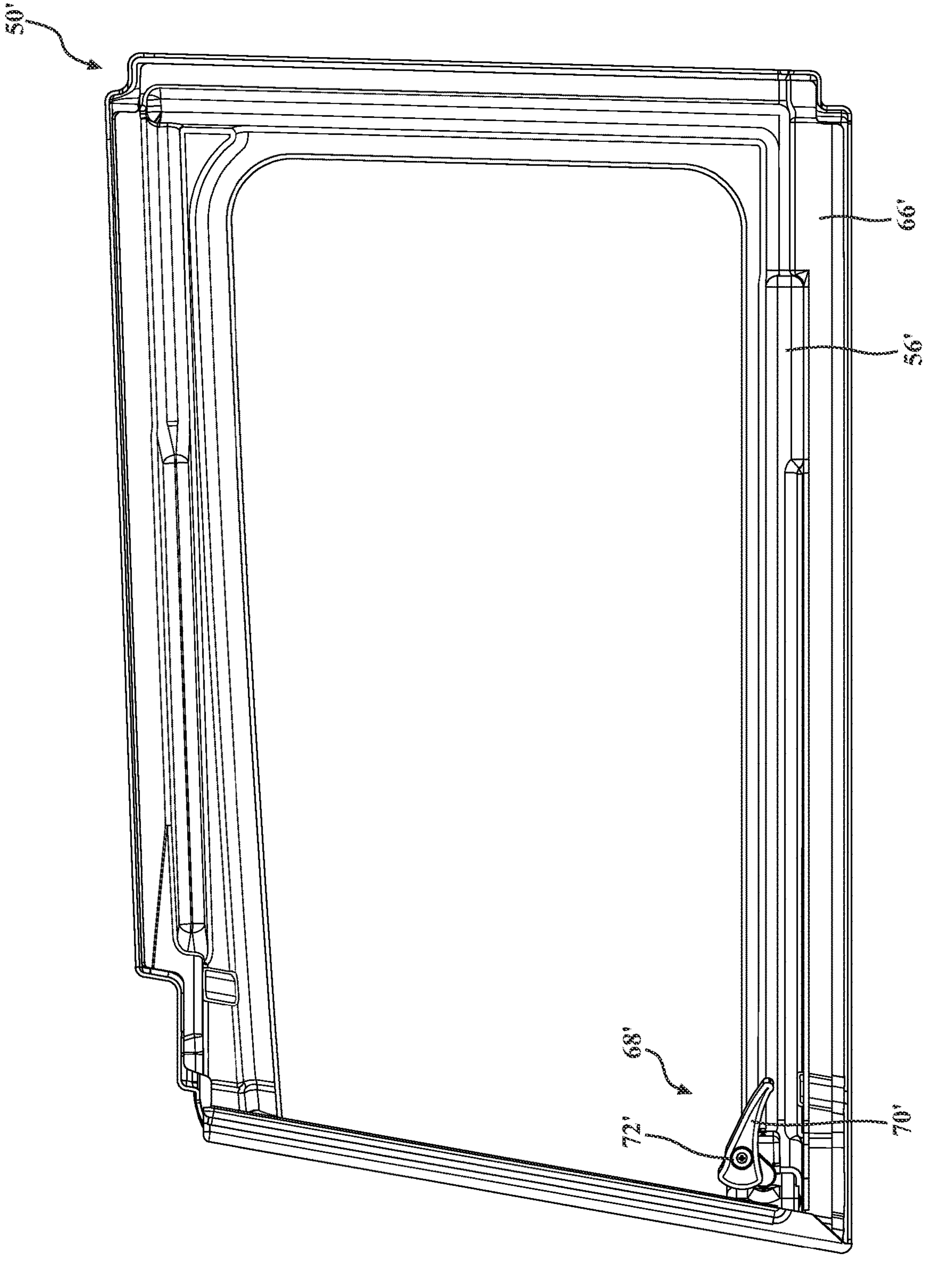
FIG. 22 is a side elevational view of the rear corner window assembly.
Figure 24:
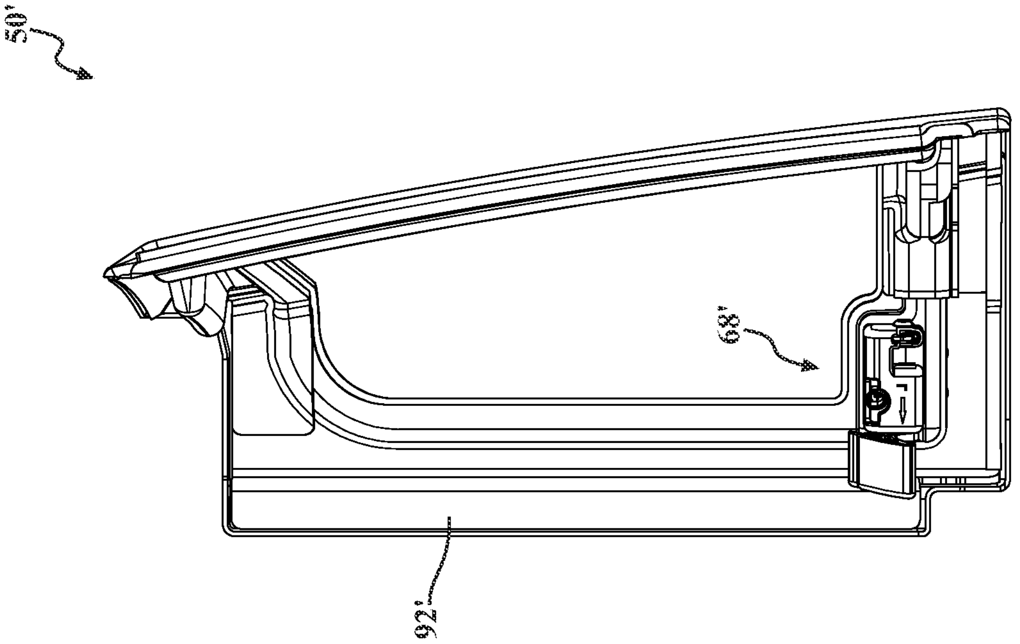
FIG. 24 is an end side elevational view of the rear corner window assembly.
Figure 23:
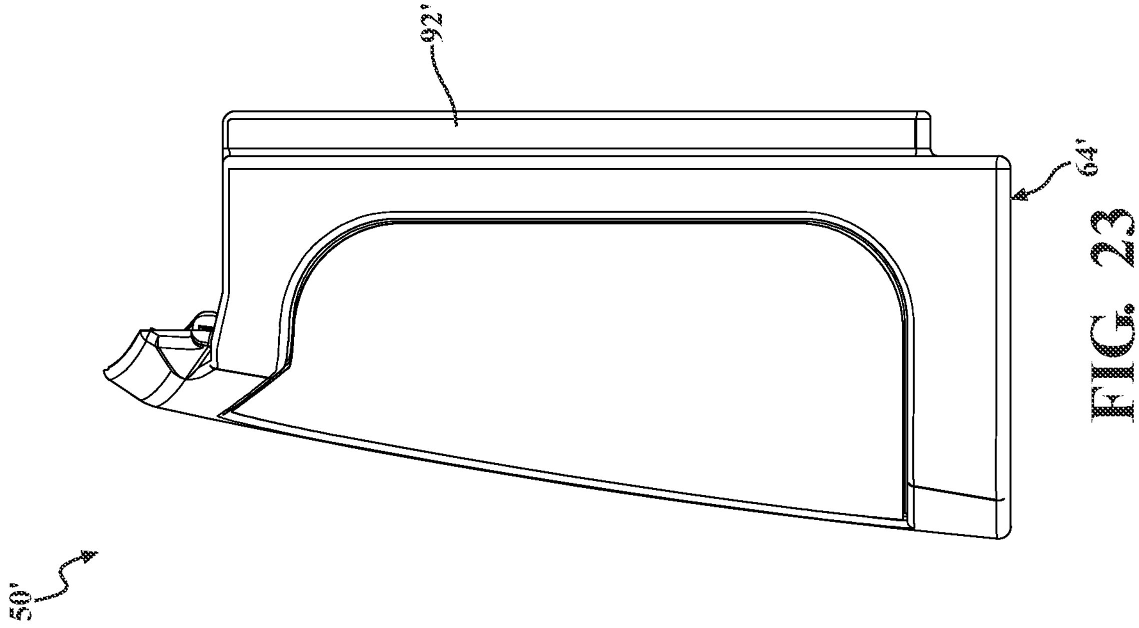
FIG. 23 is an end side elevational view of the rear corner window assembly.
Figure 25:
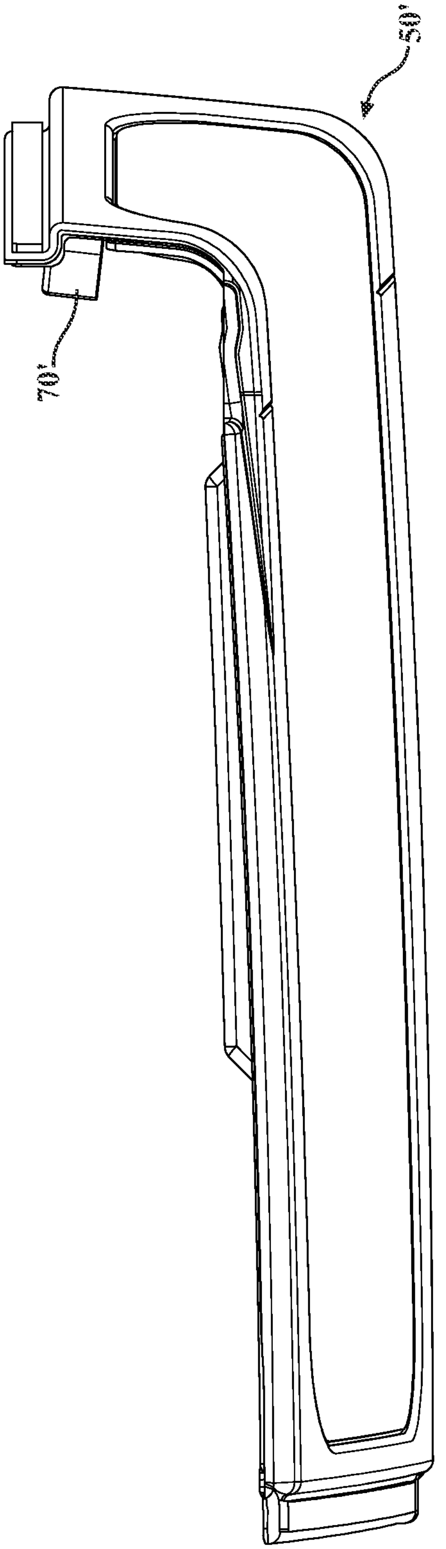
FIG. 25 is a top perspective view of the rear corner window assembly.
Figure 26:
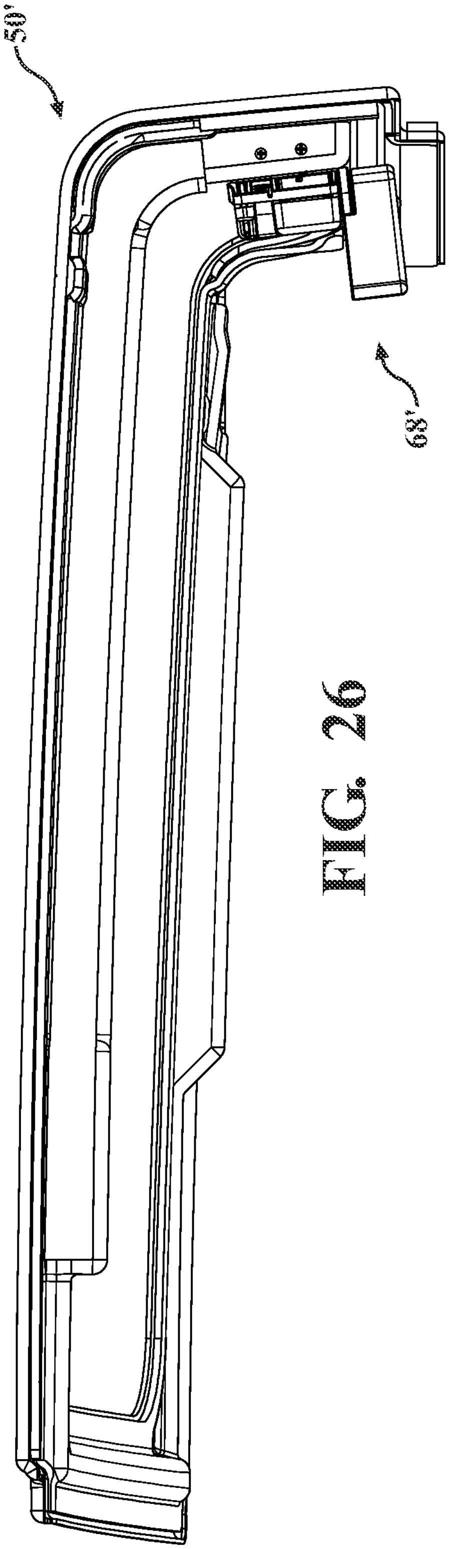
FIG. 26 is a bottom perspective view of the rear corner window assembly.
Figure 27:
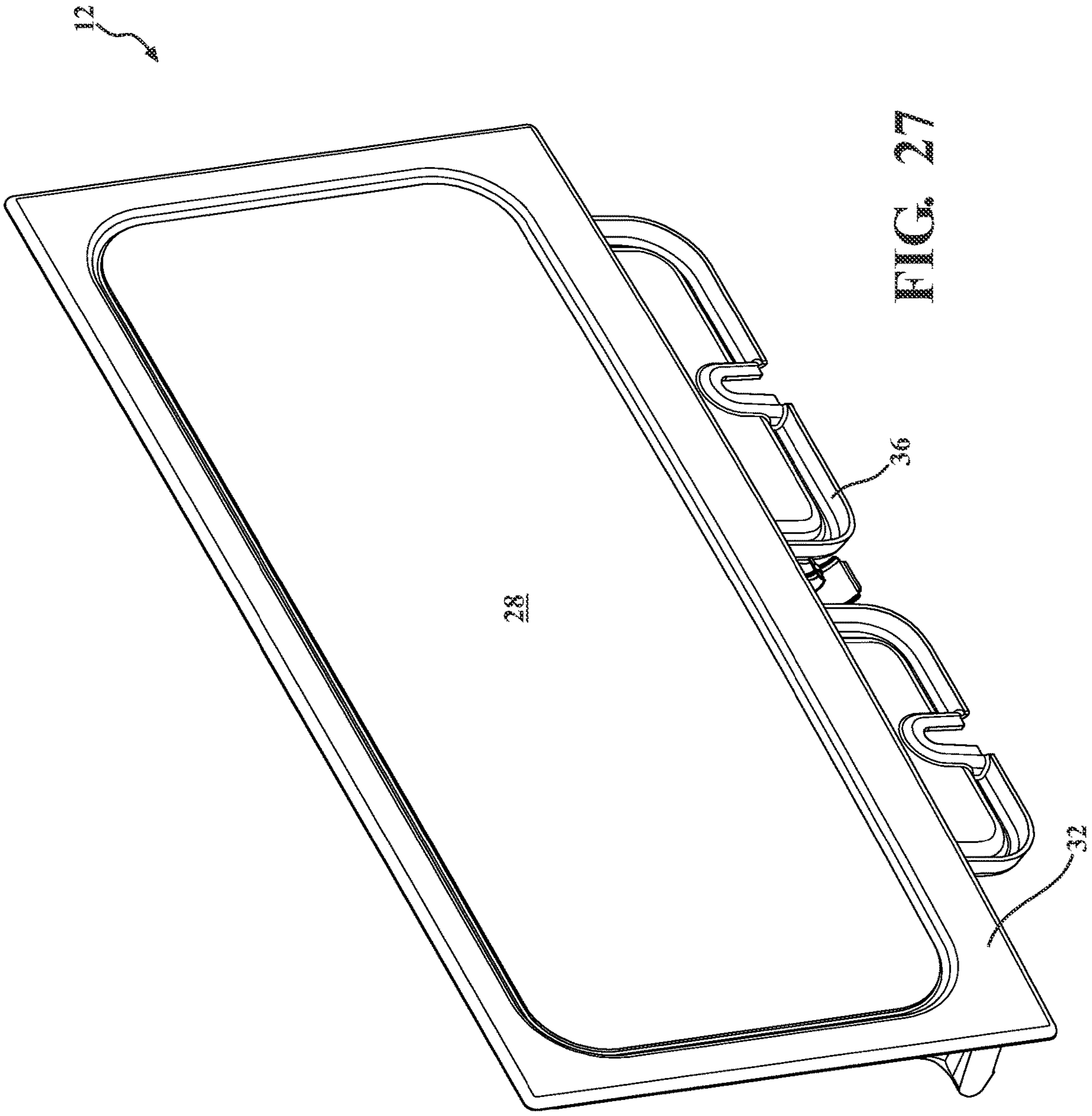
FIG. 27 is a side perspective view of a rear window assembly.
Figure 28:
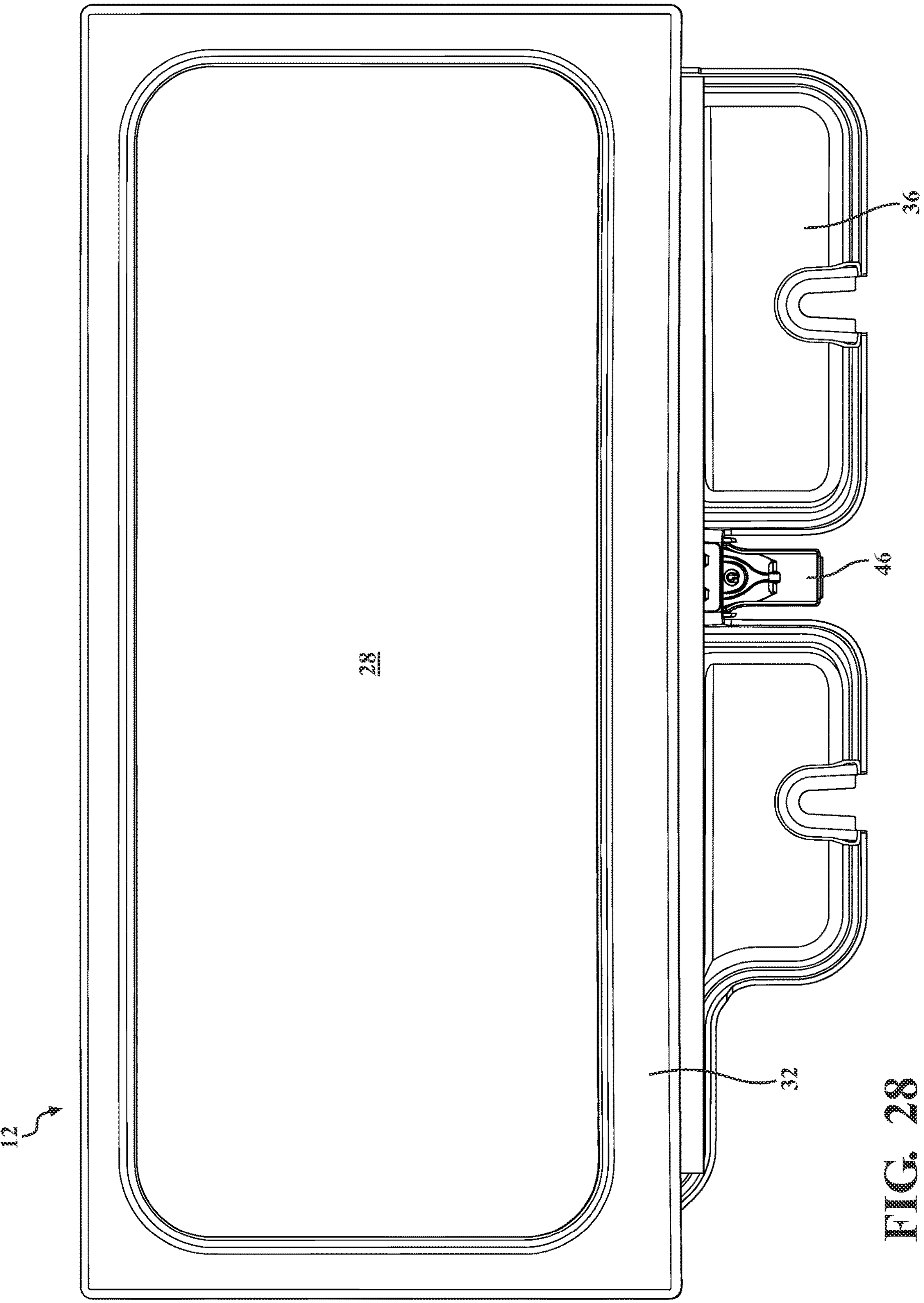
FIG. 28 is a side elevational view of the rear window assembly.
Figure 29:
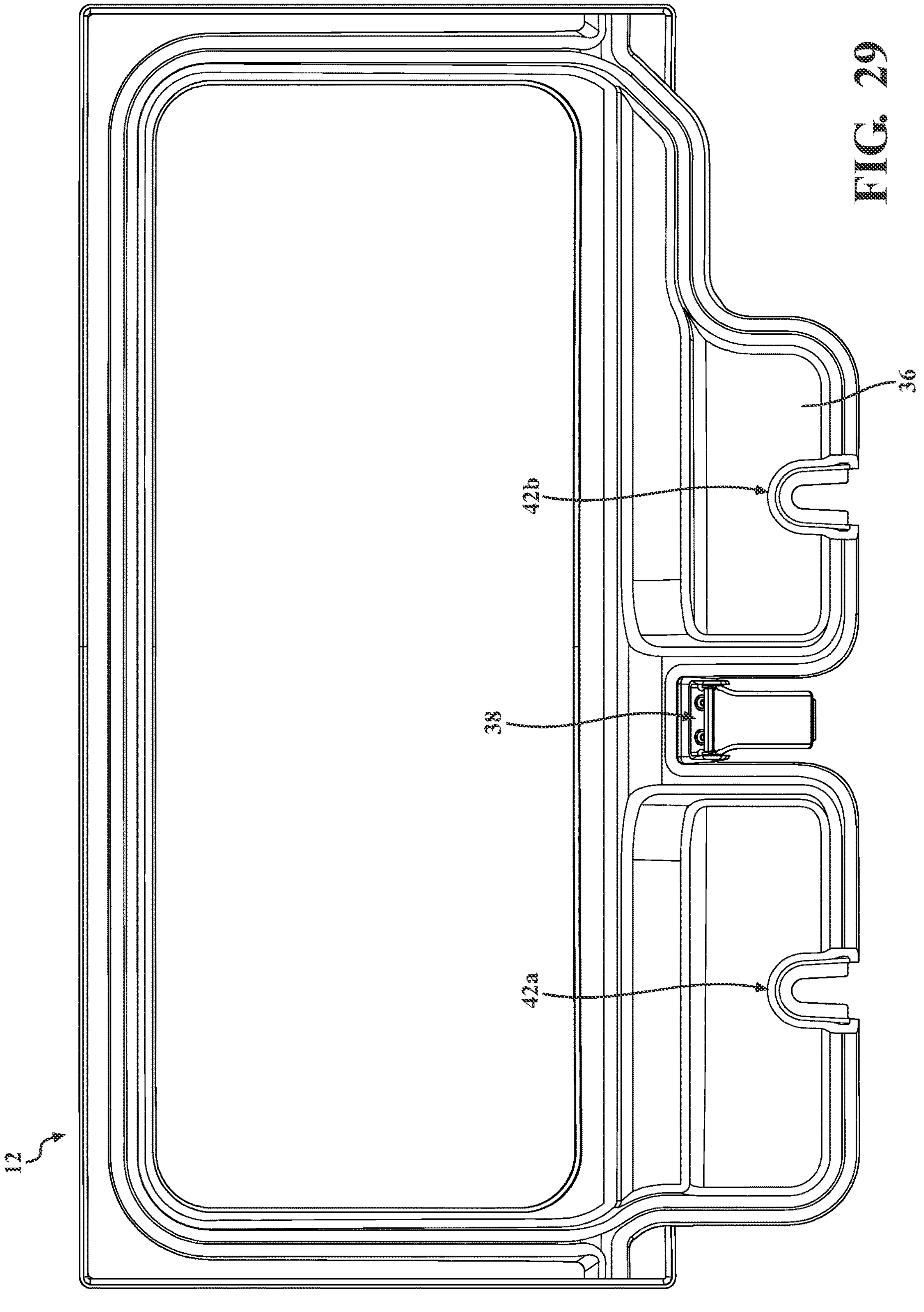
FIG. 29 is a side elevational view of the rear window assembly.
Figure 31:
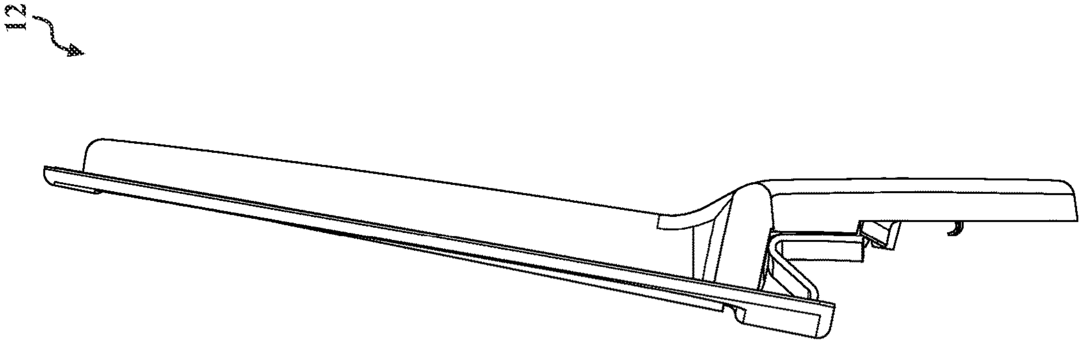
FIG. 31 is an edge side elevational view of the rear window assembly.
Figure 30:
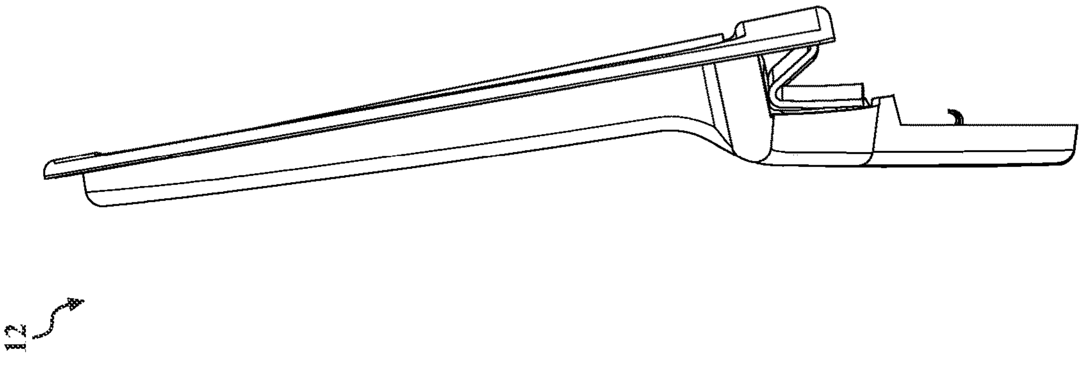
FIG. 30 is an edge side elevational view of the rear window assembly.
Figure 32:
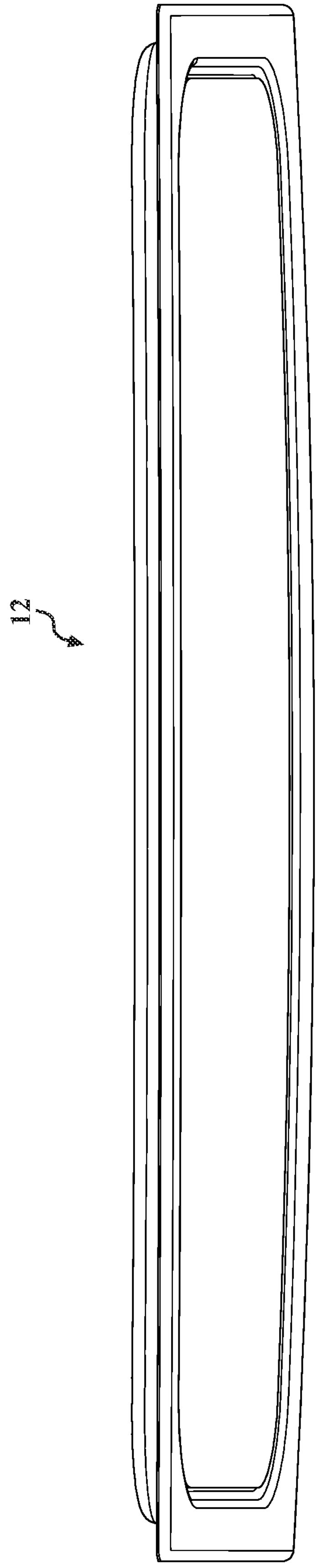
FIG. 32 is a top side perspective view of the rear window assembly.
Figure 33:
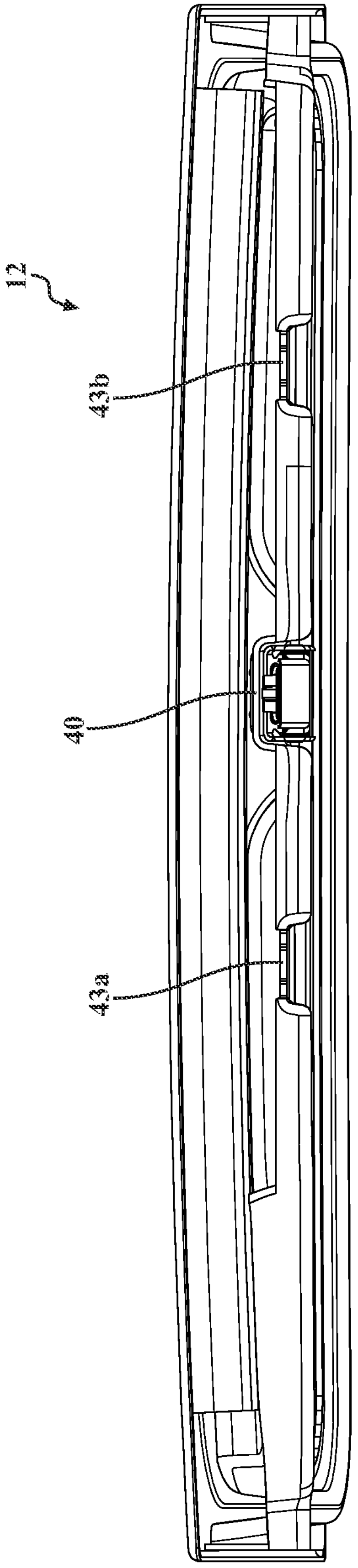
FIG. 33 is a bottom side perspective view of the rear window assembly.
Figure 34:
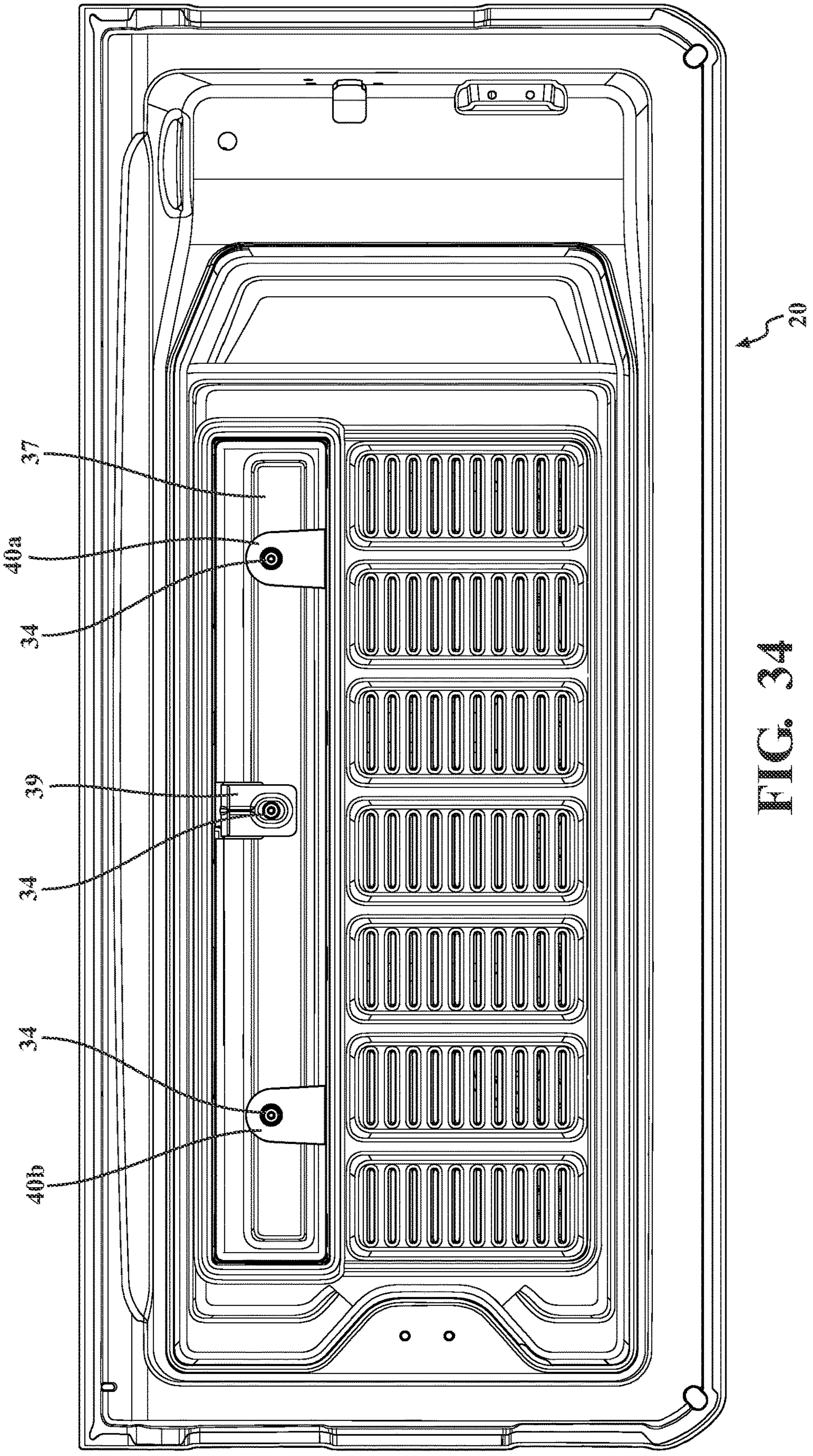
FIG. 34 is a side elevational view of the door envelope with the connection belt.
Figure 35:
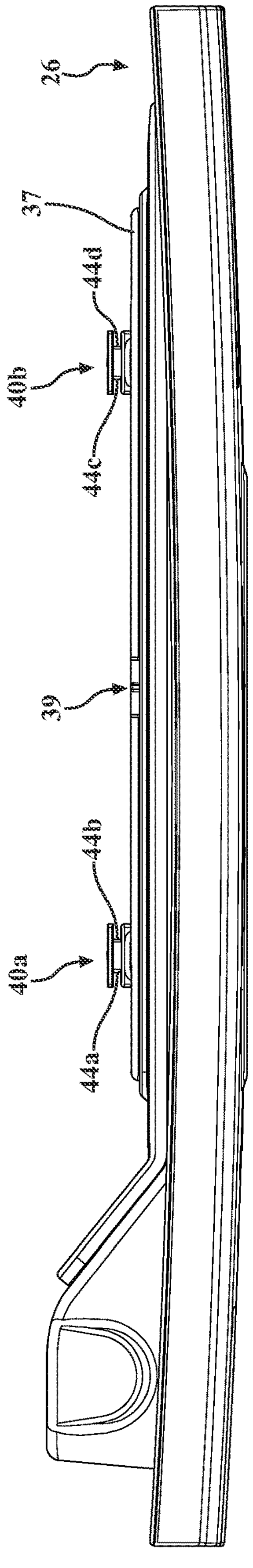
FIG. 35 is a top plan view of the door envelope with the connection belt.
Figure 36:
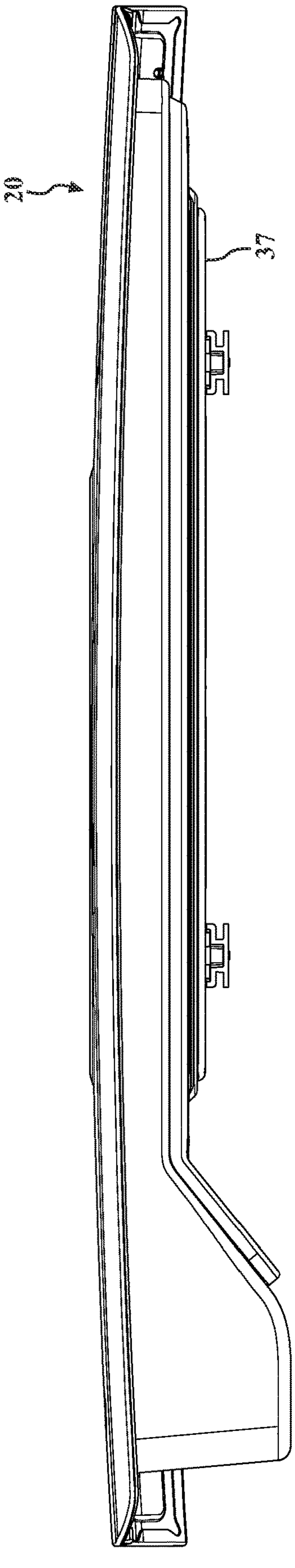
FIG. 36 is a top plan view of the door envelope with the connection belt.
Figure 37:
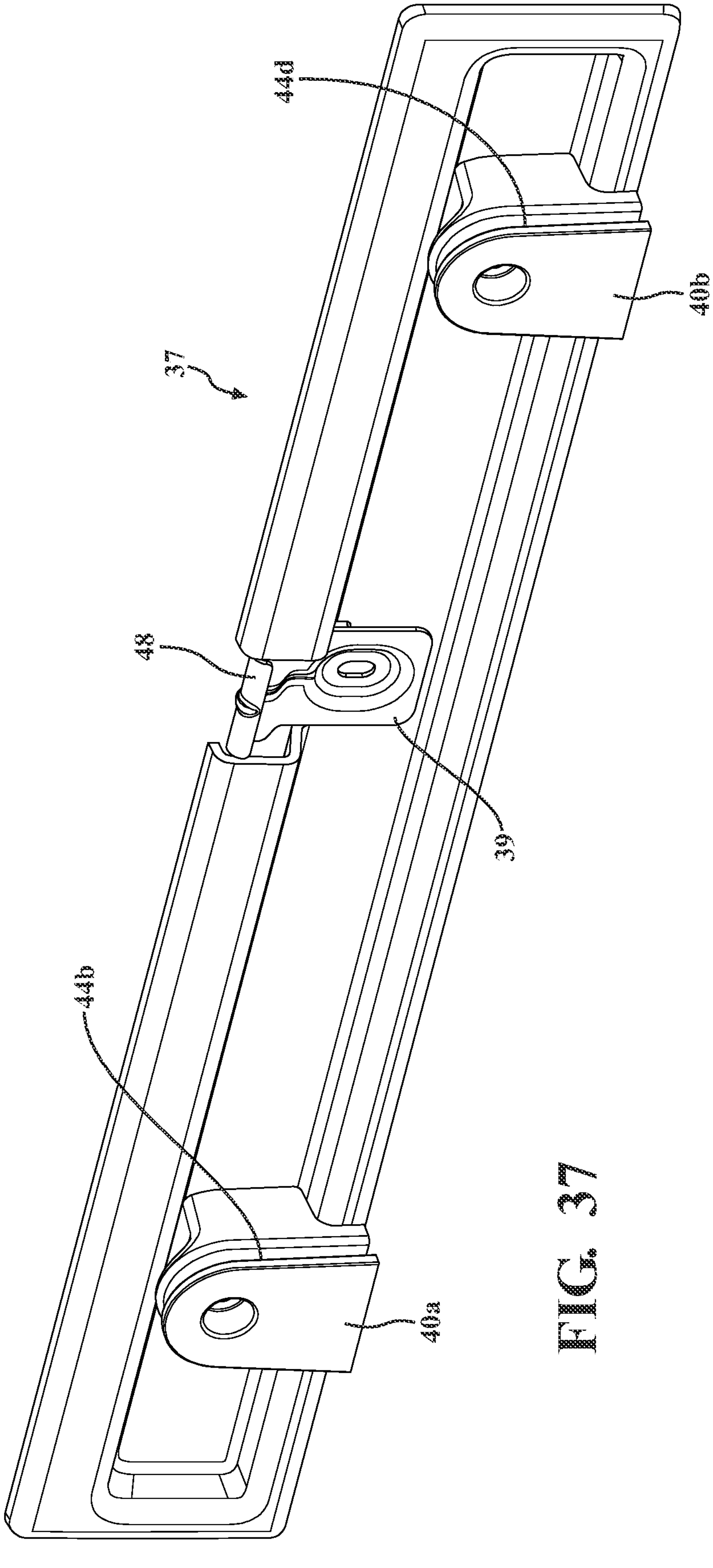
FIG. 37 is a side perspective view of the connection belt.
Figure 38:
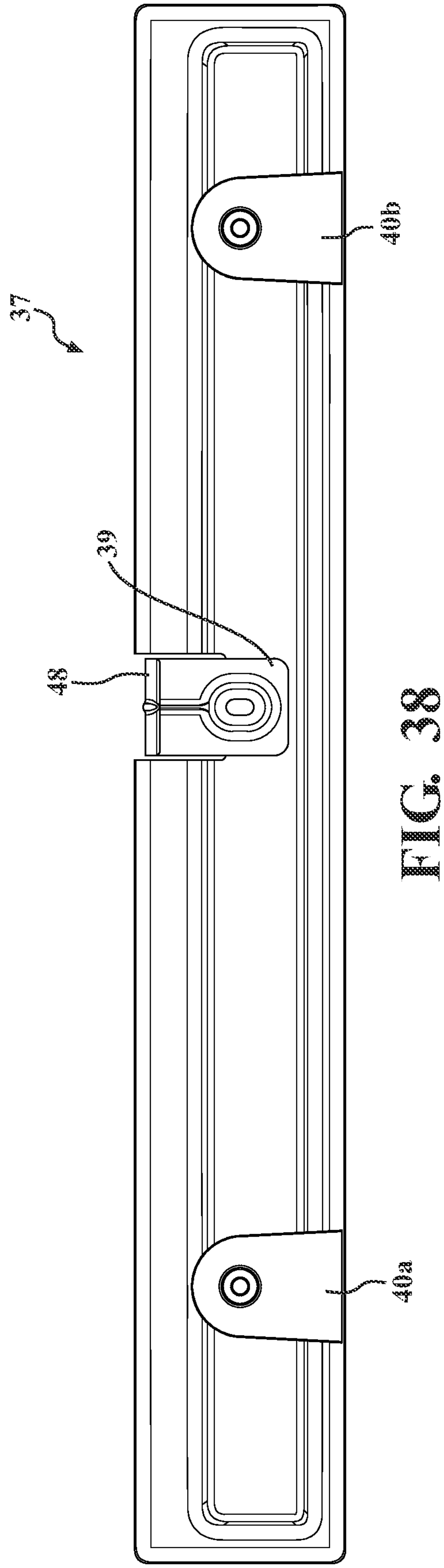
FIG. 38 is an elevational view of the connection belt.
Figure 39:
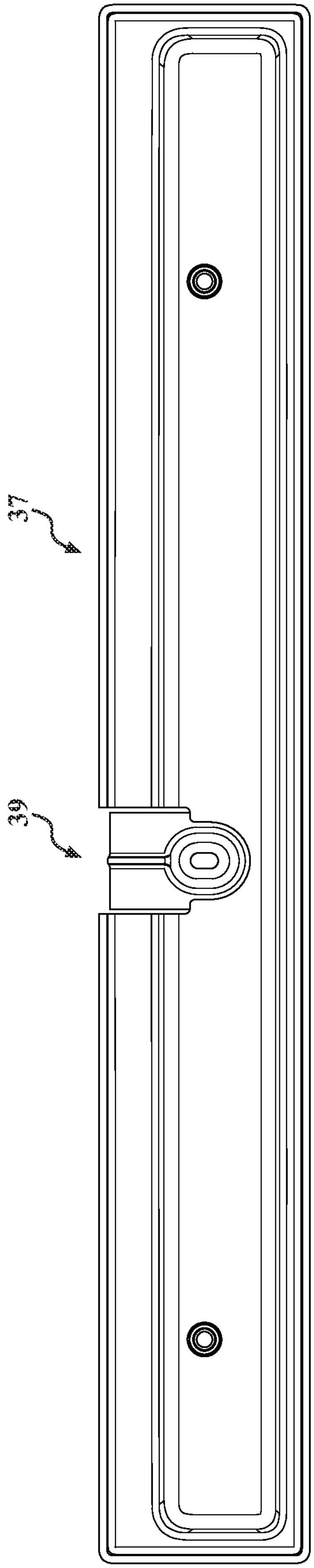
FIG. 39 is an elevational view of the connection belt.
Figure 40:
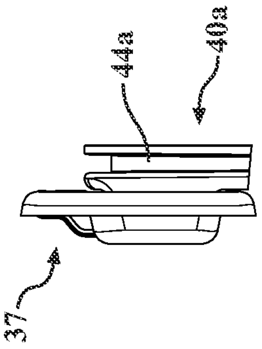
FIG. 40 is an end side elevational view of the connection belt.
Figure 41:
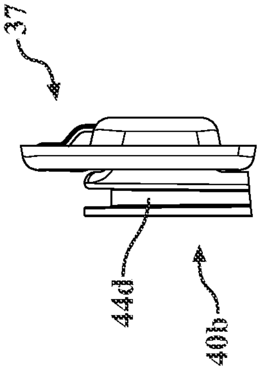
FIG. 41 is an end elevational view of the connection belt.
Figure 42:
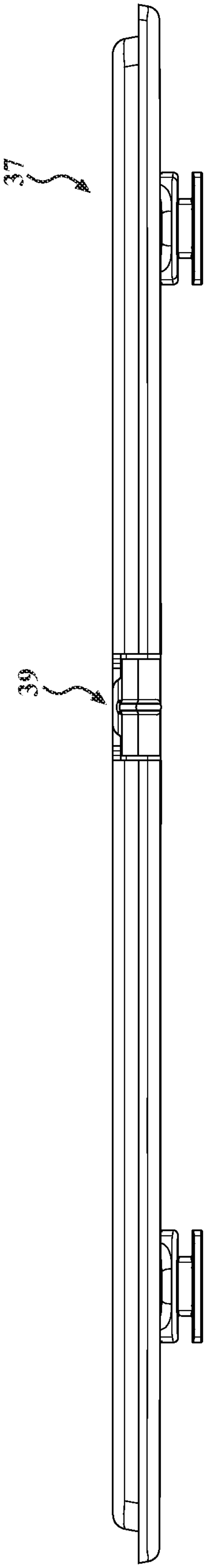
FIG. 42 is a top elevational view of the connection belt.
Figure 43:
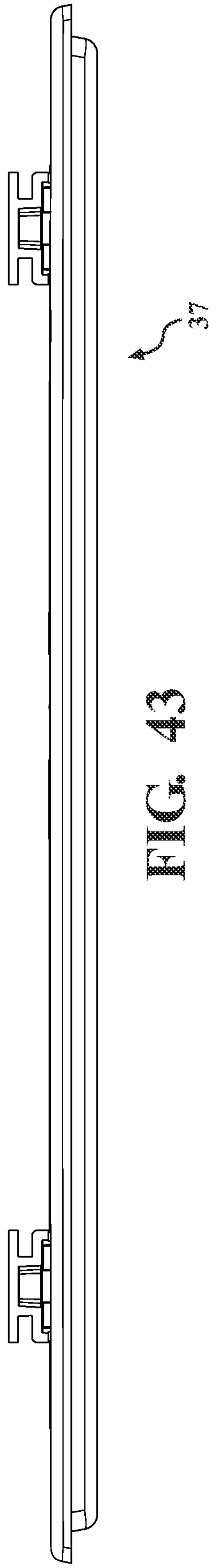
FIG. 43 is a bottom elevational view of the connection belt.

FIGS. 1-11 show the window assembly 12 removal steps, which include opening the tailgate 10 and unlatching the latch member 38 which is accomplished by moving a handle 47 on the latch member 38, to rotate the handle 47 about a pivot 49 and disengage a hook 47 of the latch member 38 from a lip 48 on the latch plate 39, as best shown in FIG. 9. Then the window assembly 12 is moved upward to disengage the lower skirt 36 from the locator wedges 40*a*, 40*b* of the connection belt 37 by sliding the edges of grooves 42*a*, 42*b* on the lower skirt 36 out of grooves 44*a*, 44*b*, 44*c*, 44*d* of locator wedges 40*a*, 40*b*. Lastly the door envelope 20 is moved to the closed position, as shown in FIG. 5, and the vehicle 7 can be operated with just the rear window assembly 12 removed. Assembly of the window assembly 12 to the door envelope 20 occurs in a reciprocal opposite manner. First the tailgate 10 is opened. Next the window assembly 12 is positioned above the door envelope 20 and lowered vertically so that the lower skirt 36 aligns with and contacts the locator wedges 40*a*, 40*b*. During this step the edges of the grooves 42*a*, 42*b* slide into a respective one of the grooves 44*a*, 44*b*, 44*c*, 44*d* of the lower skirt 36. Lastly the latch member 38 handle 46 is rotated about pivot 49 to engage the hook 47 of the latch member 38 with the lip 48 on the latch plate 39.

Referring to FIGS. 6, 7 and 12 through 26, the details and removal of a rear corner window assembly 50, 50' for the right and left side of the vehicle 7 is described. The rear corner window assembly 50 is for the right side of the vehicle 7 and the rear corner window assembly 50' is for the left side of the vehicle 7 as shown. The structure of and the removal of the rear corner window assembly 50' is the same as the rear corner window assembly 50, with the only difference being the rear corner window assembly 50 is on the left side of the vehicle 7 and the rear corner window assembly 50 is on the right side of the vehicle.

The rear corner window assembly 50, 50' has a window glass 52, 52' mounted in a window frame 54, 54'. The window frame 54, 54' has a bottom edge 56, 56' that rests on a deck 58, 58' of the vehicle 7 above the respective rear wheel well 14, 14'. A top edge 61, 61' of each rear corner window assembly 50, 50' engages a roof 60 of the vehicle 7 when connected. The roof 60 is a soft flexible material such as fabric or soft fabric that is capable of folding when the rear window assembly 12 and rear corner window assembly 50, 50' are removed. The material of the roof will overlay and support the top edge 61, 61' when the rear corner window assembly 50, 50' is connected to the vehicle 7. The window frame 54, 54' has a side portion 62, 62' extending in a longitudinal direction of the vehicle and a rear portion 64, 64' extending generally transverse to the longitudinal axis of the vehicle 7.

Referring to FIGS. 6, 7 and 12 through 26 the connection features of rear corner window assembly 50 for the right side of the vehicle 7, are shown in greater detail, while it is to be understood that the rear corner window assembly 50' has the same features, but in a mirror image orientation to account for being on the left side of the vehicle 7. The foregoing features of the rear corner window assembly 50' are also seen in FIGS. 21-26, however details shown in rear corner window assembly 50 shown in FIGS. 13-20 are also present in rear corner window assembly 50'. The bottom edge 56,56' that rests against the deck 58, 58' is a protruding surface extending from an inside surface of the respective side portion 62, 62' and forms a ledge that rests against the deck 58,58', while a portion of the inside surface 66 extends downward past the bottom edge 56.

Figure 6:
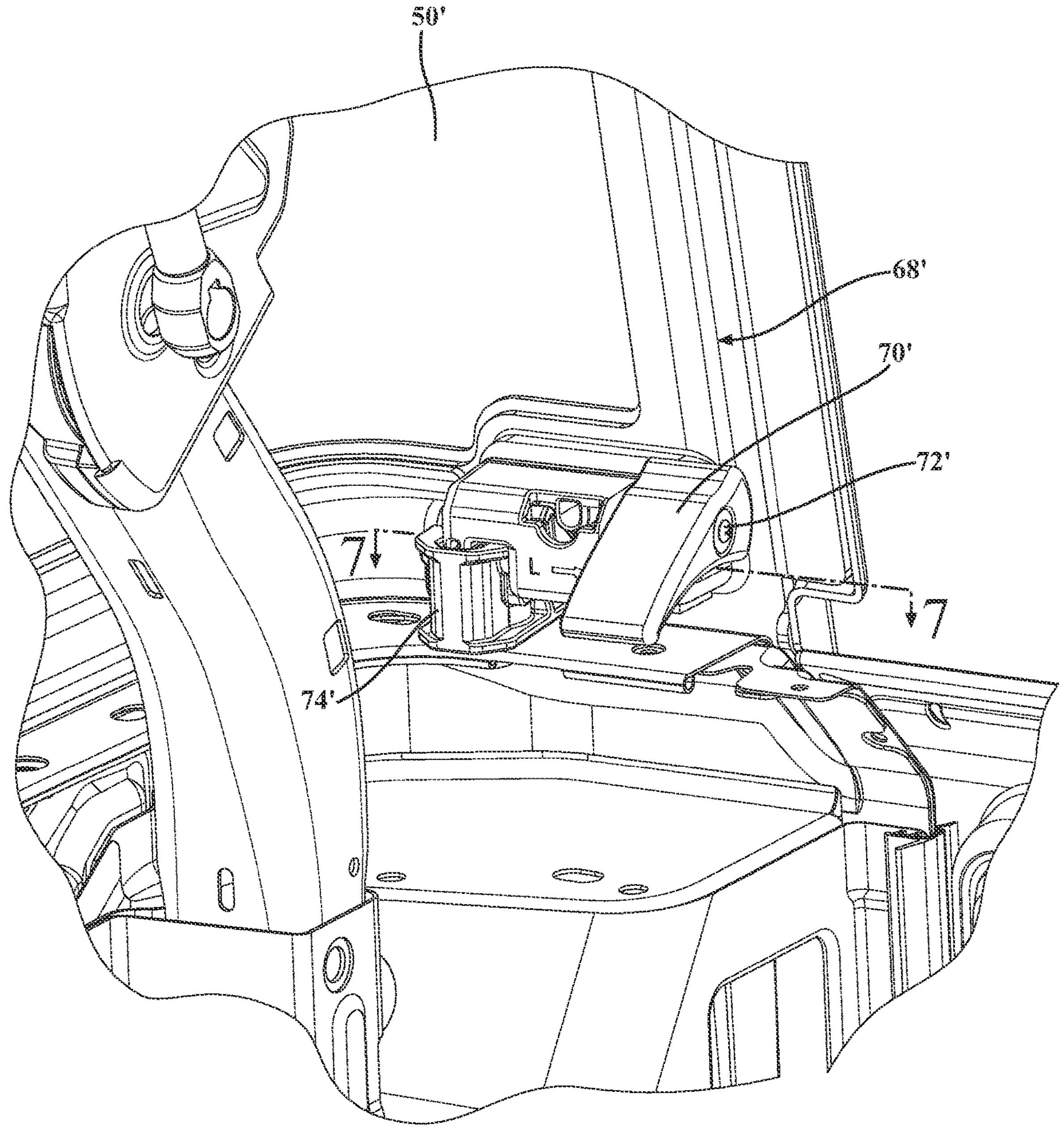
FIG. 6 is an enlarged perspective view of a latch of a rear corner window assembly connected to a striker body.
Figure 7:
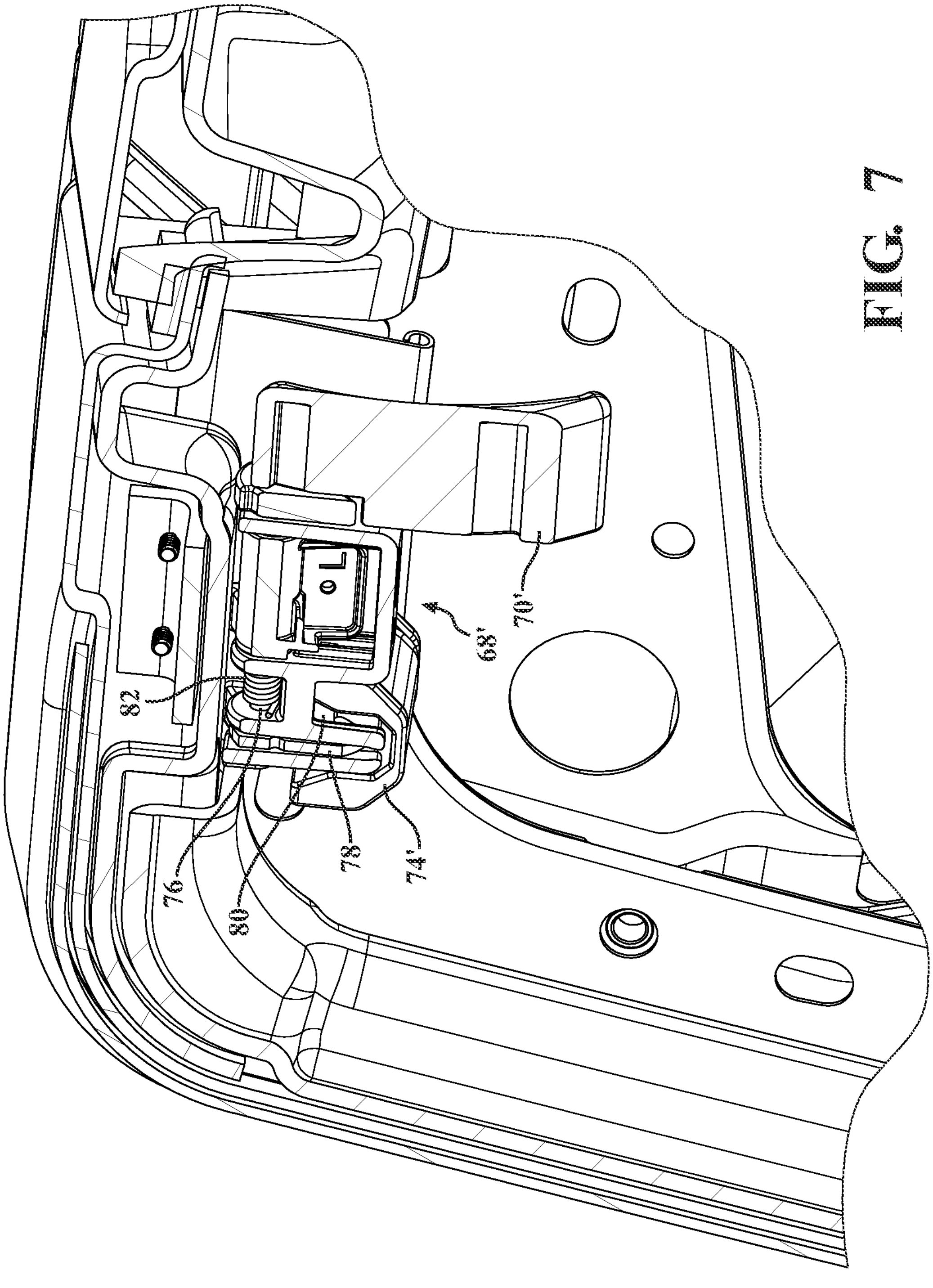
FIG. 7 is a cross sectional plan view of the latch and striker body.
Figure 8:
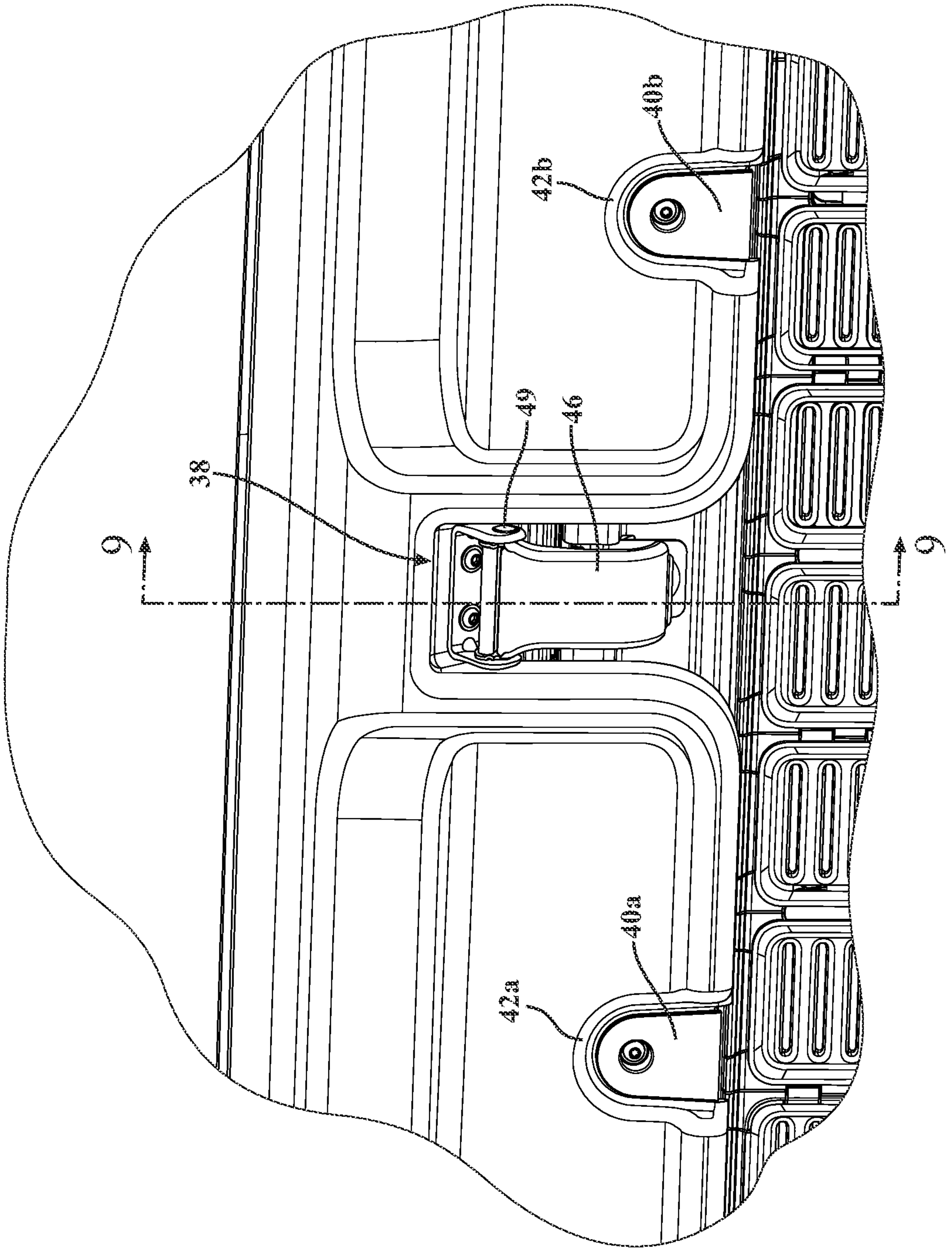
FIG. 8 is an enlarged elevational view of a lower skirt of a rear window assembly connected to a connection belt.

Each rear corner window assembly 50, 50' is locked into position using a latch 68, 68' located on an inside surface of the rear portion 64, 64'. When in the locked position the latch 68, 68' prevents the rear corner window assembly 50, 50' from sliding off the deck 58, 58'. FIG. 6 show the latch 68' which is for the left side of the vehicle 7 and has identical components but is the mirror opposite of the latch 68 that is for the right side of the vehicle 7. Latch 68, 68' has a handle 70, 70' that rotates about a pivot 72, 72' to unlock the latch from a striker body 74, 74' that is mounted to the deck 58, 58' of the vehicle 7. FIG. 7 shows a cross-sectional view of the latch 68' and the striker body 74', which is the mirror opposite of the latch 68 and striker body 74. The latch 68' has a pivotal shaft 76 that is connected to and rotated by the handle 70. A tongue 78 is connected to and rotates with the shaft 76. The tongue 78 has a hook surface that engages a striker bolt 80 of the striker body 74 to lock the latch 68 to the striker body 74. A spring 82 is positioned about the shaft 76 and biases the shaft 76 to rotate the tongue 78 so that it hooks around the striker bolt 80 unless the tongue 78 is released by moving the handle 70' and the shaft 76 to lift the tongue 78 away from the striker bolt 80.

Each rear corner window assembly 50, 50' has a forward edge 84, 84' with a forward flange 86, 86' that is used to align and secure the forward edge 84, 84' of the corner window assembly 50, 50' when connected to the vehicle 7. When the rear corner window assembly 50, 50' is connected to the vehicle 7, the forward edge 84, 84' abuts a pillar 88, 88'. The pillar 88, 88' is connected to the vehicle 7 and includes a channel 90, 90'. The respective forward flange 86, 86' slides into the channel 90, 90' to provide alignment and stability to the forward edge 84, 84' and the rear corner window assembly 50, 50'.

The method of removal of the rear corner window assembly 50, 50' takes place after the steps for removing the rear window assembly 12, described above are completed. The reason for this is that when the tailgate 10 is closed the outer subframe 32 of the rear window assembly 12 abuts adjacent rear flanges 92, 92' of rear corner window assembly 50, 50' so that the outside surface of the rear corner window assembly 50, 50' and rear window assembly 12 are generally flush and continuous to create a good fit and seal between the rear window assembly 12 and each rear corner window assembly 50, 50'.

The rear corner window assembly 50, 50' can each be separately removed from the vehicle 7 by first disengaging the respective latch 68, 68' by pivoting the handle 70, 70', which releases the latch 68, 68' from the striker body 74, 74'. The rear corner window assembly 50, 50' is translating rearward to slide the respective forward flange 86, 86' out of the channel 90, 90' of the pillar 88, 88'. The rear corner window assembly 50, 50' continues to slide so that the bottom edge 56, 56' slides off of the deck 58, 58' of the vehicle 7. The rear corner window assembly 50, 50' is attached by doing the aforementioned steps in reverse.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A tailgate for a vehicle comprising:
- a door envelope, and
- a rear window assembly including a window frame and a window glass mounted in said window frame,
- wherein said rear window assembly has a latch that secures a connection with said door envelope;
- a connection belt connected to the door envelope;
- a latch plate connected to the connection belt,
- a lower skirt of the rear window assembly that contacts the connection belt to hold the rear window assembly onto the door envelope, wherein the latch is connected to the lower skirt and the latch contacts and locks onto the latch plate when the rear window assembly is connected to the door envelope;
- at least one locator wedge located on the connection belt, wherein the at least one locator wedge has at least one groove, and
- at least one groove located on the lower skirt that slide into the at least one groove on the at least one locator wedge for aligning and securing the rear window assembly to the door envelope to form the tailgate.

2. The tailgate of claim 1 wherein the latch and latch plate connection is located adjacent a lateral center of said window assembly.

3. The tailgate of claim 1 wherein the latch has a hook that engages a lip on the latch plate to secure the latch to the latch plate.

4. The arrangement of claim 1 further comprising:
- a forwardly inclined flange surface formed on the door envelope;
- an outer subframe of the window frame that extends outwardly over the forward incline flanged surface of the door envelope.

5. A rear corner window assembly for connection to a vehicle comprising:
- a window glass mounted in a window frame, the window frame includes a bottom edge, a top edge, a side portion extending in a longitudinal direction and a rear portion that curves and extends away from the side portion,
- a latch located on an inside surface of the rear portion;
- a handle that rotates about a pivot to unlock the latch from a striker body;
- a shaft connected to and rotated by the handle, and
- a tongue connected to and rotates with the shaft, wherein the tongue engages a striker bolt on the striker body to releasably lock the latch to the striker body, wherein the latch further includes a spring is positioned about the shaft and biases the shaft to rotate the tongue into engagement with the striker bolt, and release the tongue from the striker bolt by moving the handle and the shaft to lift the tongue away from the striker bolt.

6. The rear corner window assembly of claim 5 wherein the bottom edge has a protruding surface extending from an inside surface of the respective side portion and forms a ledge while a portion of the inside surface extends downward past the bottom edge.

7. The rear corner window assembly of claim 6 further comprising:
- a forward edge of the window frame;
- a forward flange extending from the forward edge used to align and secure the forward edge.

8. The rear corner window assembly of claim 7 further comprising:
- a forward edge of the window frame;
- a forward flange extending from the forward edge used to align and secure the forward edge.

9. An arrangement for a tailgate and rear corner window assembly of a vehicle comprising:
- a door envelope for pivotal attachment to the vehicle;
- a rear window assembly including a window frame and a window glass mounted in said window frame;
- wherein said rear window assembly has a latch that secures a connection with said door envelope;
- at least one rear corner window assembly for connection to the vehicle having a window glass mounted in a window frame, the window frame includes a bottom edge, a top edge, a side portion extending in a longitudinal direction and a rear portion that curves and extends away from the side portion,
- a latch located on an inside surface of the rear portion of the at least one rear corner window assembly;
- a connection belt connected to the door envelope;
- a latch plate connected to the connection belt,
- a lower skirt of the rear window assembly that contacts the connection belt to hold the rear window assembly onto the door envelope, wherein the latch is connected to the lower skirt and the latch contacts and locks onto the latch plate when the rear window assembly is connected to the door envelope;

at least one locator wedge located on the connection belt, wherein the at least one locator wedge has at least one groove, and at least one groove located on the lower skirt that slide into the at least one groove on the at least one locator wedge for aligning and securing the rear window assembly to the door envelope to form the tailgate.

10. The arrangement of claim 9 wherein the latch and latch plate connection is located adjacent a lateral center of said window assembly.

11. The arrangement of claim 9 wherein the latch has a hook that engages a lip on the latch plate to secure the latch to the latch plate.

12. The arrangement of claim 9 further comprising:

a forwardly inclined flange surface formed on the door envelope;

an outer subframe of the window frame that extends outwardly over the forward incline flanged surface of the door envelope.

13. The arrangement of claim 9 wherein the bottom edge of the at least one rear corner window assembly has a protruding surface extending from an inside surface of the respective side portion and forms a ledge while a portion of the inside surface extends downward past the bottom edge.

14. An arrangement for a tailgate and rear corner window assembly of a vehicle comprising:

a door envelope for pivotal attachment to a vehicle;

a rear window assembly including a window frame and a window glass mounted in said window frame;

wherein said rear window assembly has a latch that secures a connection with said door envelope;

at least one rear corner window assembly for connection to the vehicle having a window glass mounted in a window frame, the window frame includes a bottom edge, a top edge, a side portion extending in a longitudinal direction and a rear portion that curves and extends away from the side portion, a latch located on an inside surface of the rear portion of the at least one rear corner window assembly;

a handle that rotates about a pivot to unlock the latch from a striker body;

a shaft connected to and rotated by the handle;

a tongue connected to and rotates with the shaft, wherein the tongue engages a striker bolt on the striker body to releasably lock the latch to the striker body, and wherein the latch of the at least one rear corner window assembly further includes a spring is positioned about the shaft and biases the shaft to rotate the tongue into engagement with the striker bolt, and release the tongue from the striker bolt by moving the handle and the shaft to lift the tongue away from the striker bolt.

15. The arrangement of claim 13 further comprising:

a forward edge of the window frame;

a forward flange extending from the forward edge used to align and secure the forward edge.

16. The arrangement of claim 9 further comprising:

a forward edge of the window frame;

a forward flange extending from the forward edge used to align and secure the forward edge.

* * * * *